US010909482B2

(12) United States Patent
Thornberry et al.

(10) Patent No.: US 10,909,482 B2
(45) Date of Patent: Feb. 2, 2021

(54) BUILDING MATERIALS ESTIMATION

(71) Applicant: Pictometry International Corp., Rochester, NY (US)

(72) Inventors: Dale R. Thornberry, Carmel, IN (US); Christopher T. Thornberry, Indianapolis, IN (US); Thom S. Salter, Pittsford, NY (US)

(73) Assignee: Pictometry International Corp., Rochester, NY (US)

( * ) Notice: Subject to any disclaimer, the term of this patent is extended or adjusted under 35 U.S.C. 154(b) by 0 days.

(21) Appl. No.: 13/839,578

(22) Filed: Mar. 15, 2013

(65) Prior Publication Data

US 2014/0278697 A1 Sep. 18, 2014

(51) Int. Cl.
*G06Q 10/06* (2012.01)
*G06Q 50/08* (2012.01)
(Continued)

(52) U.S. Cl.
CPC ......... *G06Q 10/0631* (2013.01); *G06Q 50/08* (2013.01); *G06Q 30/0283* (2013.01);
(Continued)

(58) Field of Classification Search
CPC ........ G06Q 10/06; G06Q 40/08; G06Q 50/06; G06Q 50/08; G06T 7/55; G06T 7/60;
(Continued)

(56) References Cited

U.S. PATENT DOCUMENTS 2,791,151 A  5/1957 Pennington
3,617,016 A  11/1971 Bolsey
(Continued)

FOREIGN PATENT DOCUMENTS

AU  2008230031 B8  11/2009
CA  2191954 A1  12/1995
(Continued)

OTHER PUBLICATIONS

"Measuring for a Re-Roof: Beyond the Basics," by Brad Caldwell, dated Feb. 4, 2014, retrieved from the internet on Dec. 9, 2014 <http://www.roofrinserun.com/how-to-measure-for-a-re-roof.html>, 30 pages.*
(Continued)

*Primary Examiner* — Christine M Behncke
*Assistant Examiner* — Abhijit B Sadananda
(74) *Attorney, Agent, or Firm* — Dunlap Codding, P.C.

(57) ABSTRACT

Using remote image acquisition, image processing, and computational systems and methods, it has become possible to obtain actual building dimensions that can be used to generate construction estimates for repairing or maintaining buildings. For example, actual roof dimensions can be used to provide a computer-based estimate of materials and/or materials overage needed. Instead of simply applying a generic overage percentage based on roof shape, a computer-based approach can take into account cut lines as a percentage of total roof area. The resulting computer-generated estimate is shown to be more accurate, less expensive, and faster than using a human on-site estimator.

17 Claims, 13 Drawing Sheets

(51) Int. Cl.
*G06T 15/20* (2011.01)
*G06T 17/20* (2006.01)
*G06T 7/60* (2017.01)
*G06Q 30/02* (2012.01)

(52) U.S. Cl.
CPC .............. *G06T 7/60* (2013.01); *G06T 15/205* (2013.01); *G06T 17/20* (2013.01)

(58) Field of Classification Search
CPC ....... G06T 7/174; G06T 15/00; G06T 15/005; G06T 2210/04; G06K 9/00208
See application file for complete search history.

(56) References Cited

U.S. PATENT DOCUMENTS

| | | | |
|---|---|---|---|
| 5,189,606 A * | 2/1993 | Burns | G06Q 10/06 705/7.23 |
| 5,247,356 A | 9/1993 | Ciampa | |
| 5,379,105 A | 1/1995 | Iki et al. | |
| 5,596,494 A | 1/1997 | Kuo | |
| 5,633,946 A | 5/1997 | Lachinski et al. | |
| 5,633,995 A | 5/1997 | McClain | |
| 5,983,010 A | 11/1999 | Murdock et al. | |
| 6,219,930 B1 * | 4/2001 | Reid | 33/562 |
| 6,323,885 B1 | 11/2001 | Wiese | |
| 6,333,749 B1 | 12/2001 | Reinhardt et al. | |
| 6,385,541 B1 | 5/2002 | Blumberg et al. | |
| 6,396,491 B2 | 5/2002 | Watanabe et al. | |
| 6,446,053 B1 | 9/2002 | Elliott | |
| 6,496,184 B1 | 12/2002 | Freeman et al. | |
| 6,636,803 B1 | 10/2003 | Hartz, Jr. et al. | |
| 6,836,270 B2 | 12/2004 | Du | |
| 6,950,826 B1 * | 9/2005 | Freeman | G06Q 10/087 |
| 6,980,690 B1 | 12/2005 | Taylor et al. | |
| 7,003,400 B2 | 2/2006 | Bryant | |
| 7,006,977 B1 | 2/2006 | Attra et al. | |
| 7,133,551 B2 | 11/2006 | Chen et al. | |
| 7,233,691 B2 | 6/2007 | Setterholm | |
| 7,305,983 B1 | 12/2007 | Meder et al. | |
| 7,324,666 B2 | 1/2008 | Zoken et al. | |
| 7,327,880 B2 | 2/2008 | Tek | |
| 7,333,963 B2 | 2/2008 | Widrow et al. | |
| 7,343,268 B2 | 3/2008 | Kishikawa | |
| 7,373,303 B2 | 5/2008 | Moore et al. | |
| 7,424,133 B2 | 9/2008 | Schultz et al. | |
| 7,460,214 B2 | 12/2008 | Schiavi | |
| 7,487,114 B2 | 2/2009 | Florance et al. | |
| 7,500,391 B2 | 3/2009 | Woro | |
| 7,509,241 B2 | 3/2009 | Guo et al. | |
| 7,519,206 B2 | 4/2009 | Mulet-Parada et al. | |
| 7,583,275 B2 | 9/2009 | Neumann et al. | |
| 7,629,985 B2 | 12/2009 | McArdle et al. | |
| 7,639,842 B2 | 12/2009 | Kelle et al. | |
| 7,728,833 B2 | 6/2010 | Verma et al. | |
| 7,752,018 B2 | 7/2010 | Rahmes et al. | |
| 7,787,659 B2 | 8/2010 | Schultz et al. | |
| 7,844,499 B2 | 11/2010 | Yahiro et al. | |
| 7,869,944 B2 | 1/2011 | Deaton et al. | |
| 7,873,238 B2 | 1/2011 | Schultz et al. | |
| 7,991,226 B2 | 8/2011 | Schultz et al. | |
| 7,995,799 B2 | 8/2011 | Schultz et al. | |
| 7,995,862 B2 | 8/2011 | Tao et al. | |
| 8,051,089 B2 | 11/2011 | Gargi et al. | |
| 8,068,643 B2 | 11/2011 | Schultz et al. | |
| 8,078,436 B2 | 12/2011 | Pershing et al. | |
| 8,081,798 B2 | 12/2011 | Paglieroni et al. | |
| 8,081,841 B2 | 12/2011 | Schultz et al. | |
| 8,131,514 B2 | 3/2012 | Royan et al. | |
| 8,145,578 B2 | 3/2012 | Pershing et al. | |
| 8,170,840 B2 | 5/2012 | Pershing | |
| 8,204,341 B2 | 6/2012 | Schultz et al. | |
| 8,209,152 B2 | 6/2012 | Pershing | |
| 8,233,666 B2 | 7/2012 | Schultz et al. | |
| 8,385,672 B2 | 2/2013 | Giuffrida et al. | |
| 8,401,222 B2 | 3/2013 | Thornberry et al. | |
| 8,417,061 B2 | 4/2013 | Kennedy et al. | |
| 8,463,580 B2 * | 6/2013 | Wood | 703/1 |
| 2002/0087418 A1 * | 7/2002 | Como | G06Q 30/06 705/7.12 |
| 2002/0101594 A1 | 8/2002 | Slatter | |
| 2002/0143669 A1 | 10/2002 | Scheer | |
| 2002/0154174 A1 | 10/2002 | Redlich et al. | |
| 2003/0028393 A1 | 2/2003 | Coulston et al. | |
| 2003/0103651 A1 | 6/2003 | Novak | |
| 2003/0112235 A1 * | 6/2003 | Grace | G06T 17/20 345/419 |
| 2003/0171957 A1 | 9/2003 | Watrous | |
| 2003/0233310 A1 | 12/2003 | Stavrovski | |
| 2005/0267657 A1 | 12/2005 | Devdhar | |
| 2005/0288959 A1 | 12/2005 | Eraker et al. | |
| 2006/0137736 A1 | 6/2006 | Nishitani et al. | |
| 2006/0169775 A1 | 8/2006 | Gray et al. | |
| 2006/0200311 A1 | 9/2006 | Arutunian et al. | |
| 2006/0232605 A1 | 10/2006 | Imamura | |
| 2006/0262112 A1 | 11/2006 | Shimada | |
| 2006/0265287 A1 | 11/2006 | Kubo | |
| 2007/0179757 A1 | 8/2007 | Simpson | |
| 2008/0089610 A1 * | 4/2008 | Tao et al. | 382/285 |
| 2008/0162380 A1 | 7/2008 | Suga et al. | |
| 2008/0204570 A1 | 8/2008 | Schultz et al. | |
| 2008/0221843 A1 | 9/2008 | Shenkar et al. | |
| 2008/0231700 A1 | 9/2008 | Schultz et al. | |
| 2008/0262789 A1 | 10/2008 | Pershing et al. | |
| 2008/0279447 A1 * | 11/2008 | Friedlander | G01C 11/06 382/154 |
| 2009/0085915 A1 | 4/2009 | Kelley et al. | |
| 2009/0132436 A1 * | 5/2009 | Pershing | G06T 17/10 705/400 |
| 2009/0141020 A1 | 6/2009 | Freund et al. | |
| 2009/0265193 A1 * | 10/2009 | Collins et al. | 705/4 |
| 2009/0304227 A1 | 12/2009 | Kennedy et al. | |
| 2010/0034483 A1 | 2/2010 | Giuffrida et al. | |
| 2010/0110074 A1 * | 5/2010 | Pershing | G06F 17/5004 345/423 |
| 2010/0241406 A1 | 9/2010 | Rahmes et al. | |
| 2011/0086201 A1 | 4/2011 | Shiao et al. | |
| 2011/0096083 A1 | 4/2011 | Schultz | |
| 2011/0187713 A1 | 8/2011 | Pershing et al. | |
| 2011/0205245 A1 | 8/2011 | Kennedy et al. | |
| 2011/0216962 A1 | 9/2011 | Kim et al. | |
| 2012/0007982 A1 | 1/2012 | Giuffrida et al. | |
| 2012/0035887 A1 | 2/2012 | Augenbraun et al. | |
| 2012/0044247 A1 * | 2/2012 | Naimark | G06T 15/205 345/419 |
| 2012/0170797 A1 | 7/2012 | Pershing et al. | |
| 2012/0179431 A1 * | 7/2012 | Labrie et al. | 703/1 |
| 2012/0191424 A1 | 7/2012 | Pershing et al. | |
| 2012/0209782 A1 | 8/2012 | Pershing et al. | |
| 2012/0223965 A1 | 9/2012 | Pershing | |
| 2012/0224770 A1 | 9/2012 | Strassenburg-Kleciak | |
| 2012/0243774 A1 * | 9/2012 | Chen | G06T 17/005 382/154 |
| 2012/0311053 A1 * | 12/2012 | Labrie | G06F 17/5004 709/206 |
| 2013/0083990 A1 * | 4/2013 | Stone | G06T 15/205 382/141 |
| 2013/0202157 A1 | 8/2013 | Pershing | |
| 2013/0204575 A1 | 8/2013 | Pershing | |
| 2013/0211790 A1 * | 8/2013 | Loveland | G06K 9/00637 703/1 |
| 2013/0226515 A1 | 8/2013 | Pershing et al. | |
| 2013/0262029 A1 | 10/2013 | Pershing | |
| 2014/0132635 A1 * | 5/2014 | Murdoch et al. | 345/641 |
| 2014/0278697 A1 * | 9/2014 | Thornberry et al. | 705/7.23 |

FOREIGN PATENT DOCUMENTS

| | | |
|---|---|---|
| CN | 102194120 A | 9/2011 |
| DE | 198 57 667 A1 | 8/2000 |
| EP | 1 010 966 B1 | 10/2002 |
| EP | 1 619 610 A1 | 1/2006 |
| EP | 2 251 833 A2 | 11/2010 |

(56) References Cited

FOREIGN PATENT DOCUMENTS

| JP | 2004054506 A | * | 2/2004 |
|---|---|---|---|
| JP | 2004054506 A | * | 2/2004 |
| WO | 00/29806 A2 | | 5/2000 |
| WO | 2005/124276 A2 | | 12/2005 |
| WO | 2006/040775 A2 | | 4/2006 |
| WO | 2006/090132 A2 | | 8/2006 |
| WO | 2011/094760 A2 | | 8/2011 |

OTHER PUBLICATIONS

"Estimating Roof Covering," Eleventh Edition, Chapter 3, Certainteed Shingle Applicator's Manual by American Shingles, dated Jan. 2013. Retrieved from the Internet on Dec. 9, 2014, retrieved from: <http://www.americanshingles.com.au/assets/AS-PDF-Manuals/3-Estimating.pdf>. See p. 27 (pdf p. 17 of 20).*
CertainTeed, Shingle Applicator's Manual, 2009, CertainTeed Corp., Ninth Edition, Chapter 3, pp. 23-30.*
"Estimating Roof Covering." CertainTeed Shingle Applicator's Manual, Ninth Edition, 2009, CertainTeed Corp., ch. 3, p. 23-31. (Year: 2009).*
"3D Reconstruction," retrieved Oct. 25, 2013, from http://www8cs.umu.se/kurser/TDBD19/V705/reconstruct-4.pdf, 5 pages.
"8. Epipolar Geometry and the Fundamental Matrix," retrieved Oct. 25, 2013, from http://www.robtos.ox.ac.uk/~vgg/hzbook/hzbook1/HZepipolar.pdf, 25 pages.
"AeroDach® Online Roof Evaluation Standard Delivery Format and 3D Data File," Document Version 01.00.2002 with alleged publication in 2002, 21 pages.
"AeroDach® Online Dachauswertung: Standardlieferformat und 3D-Datensatz," AEROWEST GMBH,Version 01.00.2002, 6 pages.
"AERODACH® Online Roof Analysis: Standard Delivery Format and 3D Dataset," AEROWESTGmbH, Version as of 00/01/2002, 6 pages.
"AppliCad Software and EagleView® Technologies Partner for Metal Roofing Contractors," EagleView Technologies and AppliCad Software, retrieved from blog.eagleview.com/?=614 on Feb. 1, 2012, 2 pages.
"Definitions of Surveying and Associated Terms," American Congress on Surveying and Mapping, reprinted 1989, p. 3, 2 pages.
"Glossary of the Mapping Sciences," American Society of Civil Engineering, ASCE Publications, 1994, pp. 9-10, 3 pages.
"Microsoft's MSN Virtual Earth: The Map is the Search Platform," Directions Magazine URL=http://www.directionsmag.com/article.php?article_id=873&trv=1, retrieved Feb. 6, 2009, 10 pages.
"Photo Tours Google," Web Search, retrieved Oct. 25, 2013, from http://www.google.com/search?q=photo+tours=google, 2 pages.
"Pictometry=In the News," URL=http://204.8.121.114/pressrelease%20archived/pressrelease_aec.asp, retrieved Feb. 6, 2009, 3 pages.
"Software; New Products," LexisNexis Roofing Contractor article 23(2):121(2), Jan. 3, 2006, 1 page.
"Sorcerer: Nobody builds roofs like this builds roofs," retrieved from URL=http://web.archive.org/web/2006021409237/http://www.applicad.com.au/product-features . . . on Mar. 29, 2012, 2 pages.
Aerodach, "Protokoll zur Dachauswertung," Oct. 19, 2010, 12 pages.
Aerowest GMBH, "AeroDach—das patentierte Dachaufmass," Jan. 1, 2006, retrieved from URL=http://web.archive.org/web/20060101021543/http://www.aerowest.de/aerodach.html on Mar. 25, 2012, 2 pages.
AEROWEST GMBH, "Aerowest Pricelist of Geodata," Oct. 21, 2005, 2 pages.
AEROWEST GMBH, "Geodata Service; AeroDach—Patented Roof Dimensions," Jan. 1, 2006, retrieved from URL=http://web.archive.org/web/20060101021543/http://www.aerowest.de/aerodach.html, on Mar. 25, 2012, 2 pages.
AEROWEST GMBH. "Preisliste Geodaten Aerowest," Oct. 21, 2005, 1 page.

Agarwal et al., "Reconstructing Rome," *IEEE Computer* 43(6): 40-47, Jun. 2010.
Agarwal et al., "Building Rome in a Day," *Communications of the ACM* 54(10): 105-112, Oct. 2011.
Agarwala et al., "Interactive Digital Photomontage," ACM SIGGRAPH 2004, Los Angeles, CA, Aug. 2004, 9 pages.
Agarwala et al., "Panoramic Video Textures," SIGGRAPH 2005, Los Angeles, CA, Aug. 2005, 8 pages.
Appli-cad Australia, "Linear Nesting Reports," AppliCad Sample Reports, Jul. 18, 2000, 9 pages.
Appli-cad Australia, "Roof Magician: Especially suited to single, shake and tile roofing," Sample Reports, Jun. 24, 2004, 13 pages.
Appli-cad Australia, "Roof Wizard: Advanced Software for Roof Modeling and Estimating," Document Issue 1.0.0, Sep. 25, 2004, 10 pages.
Appli-cad Australia, "Roof Wizard: Especially suited to metal roofing," Generate Offcuts Reports, Mar. 9, 2005, 7 pages.
Appli-cad Australia, "Roof Wizard: Especially suited to metal roofing," Generate Offcuts Reports, Sep. 14, 2006, 7 pages.
Appli-cad Australia, "Roof Wizard: Especially suited to metal roofing," Sample Reports, Jul. 13, 2004, 24 pages.
Appli-cad Australia, "Roof Wizard: Especially suited to metal roofing," Sample Reports, Sep. 17, 2002, 12 pages.
Appli-cad Australia, "Sorcerer: Advanced Software for Roof Modeling and Estimating," Reference Guide Version 3, Sep. 8, 1999, 142 pages.
Appli-cad Australia, "Sorcerer: The complete solution for professional roof estimating," Demonstration Kit, Mar. 9, 2005, 15 pages.
AppliCad Roofing, sample report dated Jul. 30, 2007, 1 page.
Applicad Roofing, sample report dated Mar. 2, 2005, 28 pages.
AppliCad USA, "Linear Nesting Reports," AppliCad Sample Reports, Nov. 25, 1999, 9 pages.
Applicad webpage 2005 snip different color lines, 1 page.
AppliCad, "Example Output and Brochures," retrieved from URL=http://www.applicad.com/au/product-reports.html on Apr. 16, 2012, 2 pages.
AppliCad, "Product Overview—Sorcerer: Advanced Software for Roofing Modeling, Estimating, Presentation and Installation," Issue 5, Mar. 2, 2001, 15 pages.
AppliCad, "Roofing Software: Product Bulletin Section 1—Modeling the Roof," Dec. 20, 2005, retrieved from URL=htpp://web.archive.org/web/20021122204408/http://www.applicad.com.au/ on Apr. 16, 2012, 3 pages.
AppliCad, "Roofing Software: Product Bulletin Section 1—Modeling the Roof," Jan. 7, 2002, retrieved from URL=htpp://web.archive.org/web/20021122204408/http://www.applicad.com.au/ on Apr. 16, 2012, 3 pages.
AppliCad, "Roofing Software: Product Bulletin Section 2—Modifying the Model," Dec. 20, 2005, retrieved from URL=http://web.archive.org/web/20051210130430/http://www.applicad.com.au/ on Apr. 16, 2012, 2 pages.
AppliCad, "RoofScape: Advanced Software for Roof Modeling and Estimating," Learning Guide (English Units), Revision 1.1, Aug. 2007, 48 pages.
Atkinson, "Therory of Close Range Photogrammetry," Chapter 2, Section 1, Coordinate Transformations, retrieved Oct. 21, 2013, from http://www.lems.brown.edu/vision/people/leymarie/Refs/Photogrammetry/Atkinson90/C . . . , 5 pages.
Australian Office Action for Australian Application No. 2010201839, dated Apr. 14, 2011, 2 pages.
Australian Office Action, dated Oct. 1, 2013, for Australian Application No. 2010219392, 4 pages.
Autodesk, "Autodesk ImageModeler—Features," retrieved on Sep. 30, 2008, from http://usa.autodesk.com/adsk/servlet/index?siteID=123112&id=115639 . . . , 1 page.
Automatic House Reconstruction, retrieved on Sep. 29, 2008, from http://www.vision.ee.ethz.ch/projects/Amobe_I/recons.html, 7 pages.
Azuma et al., "View-dependent refinement of multiresolution meshes with subdivision connectivity," *Proceedings of the Second International Conference on Computer Graphics, Virtual Reality, Visualization, and Interaction (Afigraph 2003)*, Capetown, South Africa, Feb. 2003, pp. 69-78.

(56) References Cited

OTHER PUBLICATIONS

Baillard et al., :Automatic reconstruction of piecewise planar models from multiple views, CVPR99, vol. 2, 1999, pp. 559-565, 7 pages.

Bazaraa et al., *Nonlinear Programming Theory and Algorithms*, Second Edition, John Wiley & Sons, Inc., New York, 1993, 330 pages.

Bhat et al., "A Perceptually-Motivated Optimization-Framework for Image and Video Processing," Computer Science & Engineering Technical Report, UW-CSE-08-06-02, University of Washington, Seattle, WA, Jun. 2008, 10 pages.

Bhat et al, "Fourier Analysis of the 2D Screened Poisson Equation for Gradient Domain Problems," ECCV 2008, 14 pages.

Bhat et al., "GradientShop: A Gradient-Domain Optimization Framework for Image and Video Filtering," ACM TOG 29(2), Mar. 2010, 14 pages.

Bhat et al., "Piecewise Image Registration in the Presence of Large Motions," CVPR 2006, New York, NY, Jun. 2006, 7 pages.

Bhat et al., "Using Photographs to Enhance Videos of a Static Scene," Eurographics Symposium on Rendering 2007, 12 pages.

Bignone et al., "Automatic Extraction of Generic House Roofs from High Resolution Aerial Imagery," *Proc. ECCV*, 1996, 12 pages Canadian Office Action, for Canadian Application No. 2,641,373, dated Jan. 9, 2012, 4 pages.

Canadian Office Action, dated Sep. 24, 2013, for Canadian Application No. 2,641,373, 4 pages.

Capell et al., "A Multiresolution Framework for Dynamic Deformations," Computer Science & Engineering Technical Report, UW-CSE-02-04-02, University of Washington, Seattle, WA, Apr. 2002, 8 pages.

Chevrier et al., "Interactive 3D reconstruction for urban areas—An image based tool," *CAAD Futures*, 2001, 13 pages.

Chuang et al., "A Bayesian Approach to Digital Matting," IEEE Computer Vision and Pattern Recognition 2001, Kauai, Hawaii, Dec. 2001, 8 pages.

Chuang et al., "Animating Pictures with Stochastic Motion Textures," SIGGRAPH 2005, Los Angeles, CA, Aug. 2005, 8 pages.

Chuang et al., "Animating Pictures with Stochastic Motion Textures," Technical Report UW-CSE-Apr. 4, 2002, SIGGRAPH 2005, Los Angeles, CA, Aug. 2005, 7 pages.

Chuang et al., "Environment Matting Extensions: Towards Higher Accuracy and Real-Time Capture," SIGGRAPH 2000, New Orleans, LA, Jul. 24-28, 2000, 11 pages.

Chuang et al., "Environment Matting Extensions: Towards Higher Accuracy and Real-Time Capture," Tech Report, SIGGRAPH 2000, New Orleans, LA, Jul. 24-28, 2000, 10 pages.

Chuang et al., "Shadow Matting and Compositing," SIGGRAPH 2003, San Diego, CA, Jul. 2003, 7 pages.

Ciarcia et al., "Automated Roof Identification Systems and Methods," U.S. Appl. No. 12/590,131, filed Nov. 2, 2009, 74 pages.

Ciarcia et al., "Automated Roof Identification Systems and Methods," U.S. Appl. No. 12/590,131, Notice of Allowance, dated Aug. 26, 2013, 9 pages.

Ciarcia et al., "Automated Roof Identification Systems and Methods," Office Action dated Jan. 9, 2013, for U.S. Appl. No. 12/590,131, 14 pages.

Ciarcia, "Systems and Methods for Point-to-Point Registration Using Perspective Imagery From Independent Sources Without Image Acquisition Metadata," U.S. Appl. No. 13/646,466, field Oct. 5, 2012, 41 pages.

Colburn et al., "Image-Based Remodeling," IEEE Transactions on Visualization and Computer Graphics, vol. 19, No. 1, Jan. 2013, 11 pages.

Curless et al., "Better Optical Triangulation Through Spacetime Analysis," Computer Systems Laboratory Technical Report CSL-TR-95-667, Stanford University, Stanford, CA, Apr. 1995, 12 pages.

Curless et al., "Computer model and 3D fax of Happy Buddha," retrieved Oct. 25, 2013, from http://www-graphics.stanford.edu/projects/faxing/happy/, 4 pages.

Curless et al., "A Volumetric Method for Building Complex Models from Range Images," SIGGRAPH '96, New Orleans, LA, Aug. 4-9, 1996, 10 pages.

Curless et al., "Better Optical Triangulation through Spacetime Analysis," 1995 5$^{th}$ International Conference on Computer Vision, Boston, MA, Jun. 20-23, 1995, 8 pages.

Curless, "New Methods for Surface Reconstruction from Range Images," Dissertation, Submitted to the Department of Electrical Engineering and the Committee of Graduate Studies of Stanford University, Jun. 1997, 209 pages.

Curless, "From Range Scans to 3D Models," *ACM SIGGRAPH Computer Graphics* 33(4): 38-41, 1999.

Debevec et al., "Modeling and Rendering Architecture from Photographs: A hybrid geometry—and image-based approach," *SIGGRAPH conference proceedings*, retrieved from www.cs.berkeley.edu/~malik/papers/debevecTM96.pdf., 1996, 10 pages.

Delaney, "Searching for Clients From Above—More Small Businesspeople Use Aerial Mapping Services to Scout Potential Customers," *The Wall Street Journal*, Jul. 31, 2007, retrieved on Feb. 25, 2010, from http://online.wsj.com/public/article/SB118584306224482891.html?mod=yahoo_free, 3 pages.

Drawing received Jan. 31, 2012.

*Eagle View Tech.* v. *Aerialogics LLC*, Case No. 2:12-cv-00618-RAJ, Prior Art Presentation, Aug. 17, 2012, 61 pages.

ECE 390, Introduction to Optimization, Spring 2004, Introductory Course, retrieved Oct. 25, 2013, from http://liberzon.csl.illinois.edu/04ECE390.html, 1 page.

Ekman, "Price Estimation Tool," Office Action for U.S. Appl. No. 13/843,437, dated Aug. 14, 2013, 9 pages.

Falkner et al., *Aerial Mapping 2nd Edition*, Lewis Publishers (CRC Press LLC), 2002, "Chapter 11—Aerotriangulation," 23 pages.

Faugeras et al., "3-D reconstruction of Urban Scenes from Sequences of Images," Institut National De Recherche En Informatique Et En Automatique, No. 2572, Jun. 1995, 27 pages.

Faugeras, "What can be seen in three dimensions with an uncalibrated stereo rig?," *Computer Vision—ECCV '92*: 563-578, 1992. (18 pages).

Fisher et al., *Dictionary of Computer Vision and Image Processing*, John Wiley & Sons, Ltd., West Sussex, England, 2005, 182 pages.

Fritsch, "Introduction into Digital Aerotriangulation," Photogrammetric Week '95, Wichman Verlag, Heidelberg, 1995, pp. 165-171, 7 pages.

Furukawa et al., "Manhattan-world Stereo," CVPR 2009, Miami, Florida, Jun. 2009, 8 pages.

Furukawa et al., "Reconstructing Building Interiors from Images," ICCV 2009, Kyoto, Japan, Sep. 2009, 8 pages.

Furukawa et al, "Towards Internet-scale Multi-view Stereo," CVPR 2010, Jun. 2010, 8 pages.

Georgeiv et al., "Spatio-Angular Resolution Tradeoff in Integral Photography," Proceedings of Eurographics Symposium on Rendering, 2006, 10 pages.

GEOSPAN Corporation, "Digital Geo-Referenced Oblique Aerial Imagery Solution EPP-REP No. 8444 May 2013," GEO-NY0000868, 2007, 28 pages.

Goesele et al., "Multi-View Stereo for Community Photo Collections," Proceedings of ICCV 2007, Rio de Janeiro, Brazil, Oct. 2007, 8 pages.

Goesele et al., "Multi-View Stereo Revisited," CVPR 2006, New York, NY, Jun. 2006, 8 pages.

Goldman et al., "Interactive Video Object Annotation," Computer Science & Engineering Technical Report, UW-CSE-07-04-01, University of Washington, Seattle, WA, Apr. 2007, 7 pages.

Goldman et al., "Schematic Storyboarding for Video Editing and Visualization." SIGGRAPH 2006, Boston, MA, Aug. 2006, 10 pages.

Goldman et al., "Shape and Spatially-Varying BRDFs From Photometric Stereo," IEEE Transactions on Pattern Analysis and Machine Intelligence, vol. 32, No. 6, Jun. 2010, 12 pages.

Goldman et al., "Shape and Spatially-Varying BRDFs From Photometric Stereo," ICCV 2005, Beijing, China, Oct. 2005, 8 pages.

Goldman et al., "Video Object Annotation, Navigation, and Composition," UIST 2008, 10 pages.

(56) References Cited

OTHER PUBLICATIONS

Gonzalez et al., *Digital Image Processing*, Addison-Wesley Publishing Company, Inc., Reading, Massachusetts, 1993, 372 pages.
Gülch et al., "On the Performance of Semi-Automatic Building Extraction," In the International Archives of Photogrammetry and Remote Sensing, vol. 23, 8 pages, 1998.
Gupta et al., "Enhancing and Experiencing Spacetime Resolution with Videos and Stills," Computer Science & Engineering Technical Report, UW-CSE-04-08-01, University of Washington, Seattle, WA, Apr. 2008, 6 pages.
Gupta et al., "DuploTrack: A Real-time System for Authoring and Guiding Duplo Block Assembly," UIST 2012, Boston, MA, Oct. 2012, 13 pages.
Gupta et al., "Enhancing and Experiencing Spacetime Resolution with Video and Stills," ICCP 2009, San Francisco, CA, Apr. 2009, 9 pages.
Gupta et al., "Single Image Deblurring Using Motion Density Functions," ECCV 2010, Crete, Greece, Sep. 2010, 14 pages.
Hartley et al., "2.4 A Hierarchy of Transformations", Multiple View Geometry in Computer Vision, Cambridge University Press, Second Edition, 2003, 9 pages.
Hartley et al., "Appendix 6: Iterative Estimation Methods," Multiple View Geometry in Computer Vision, Cambridge University Press, Second Edition, 2003, 34 pages.
Hartley et al., "Invariant and Calibration-Free Methods in Scene Reconstruction and Object Recognition," Final Technical Report, Feb. 28, 1997, 266 pages.
Hartley et al., *Multiple View Geometry in Computer Vision*, Second Edition, Cambridge University Press, Cambridge, England, 2003, 672 pages.
Held et al., "3D Puppetry: A Kinect-based Interface for 3D Animation," UIST 2012, Boston, MA, Oct. 2012, 11 pages.
Henricsson et al., "3-D Building Reconstruction with ARUBA: A Qualitative and Quantitative Evaluation," Institute of Geodesy and Photogrammerty, Swiss Federal Institute of Technology, 2001, 13 pages.
Hudson, "Merging VRML Models: Extending the Use of Photomodeller," Thesis, in TCC 402, Presented to the Faculty of the School of Engineering and Applied Science, University of Virginia, Mar. 23, 1998, 23 pages.
International Preliminary Report on Patentability for International Application No. PCT/US2011/023408, dated Aug. 16, 2012, 7 pages.
International Search Report and Written Opinion for International Application No. PCT/US2013/023502, dated Apr. 30, 2013, 8 pages.
International Search Report for International Application No. PCT/US11/23408, dated Aug. 11, 2011, 2 pages.
International Search Report for International Application No. PCT/US2013/023503, dated Apr. 30, 2013, 5 pages.
International Search Report and Written Opinion for International Application No. PCT/US2013/024523, dated Nov. 13, 2013, 15 pages.
Kolman, "Chapter 4, Linear Transformations and Matrices, 4.1: Definition and Examples," Elementary Linear Algebra, Second Edition, Macmillan Publishing Co,. Inc., 1997, 12 pages.
KP Building Products, "Vinyl Siding Estimating and Installation Guide," 2007, 32 pages.
Krainin et al., "Autonomous Generation of Complete 3D Object Models Using Next Best View Manipulation Planning," ICRA 2011, Shanghai, China, May 2011, 7 pages.
Kushal et al., "Photo Tours," 3DimPVT, Oct. 2012, 8 pages.
Levoy et al., "The Digital Michelangelo Project: 3D Scanning of Large Statues," SIGGRAPH 2000, New Orleans, LA, Jul. 24-28, 2000, 14 pages.
Levoy, "The Digital Michelangelo Project," retrieved Oct. 25, 2013, from http://www-graphics.stanford.edu/projects/mich/, 10 pages.
Li et al., "Automated Generation of Interactive 3D Exploded View Diagrams," ACM Transactions on Graphics 27(3), SIGGRAPH 2007, Aug. 2007, 7 pages.
Li et al., "Interactive Cutaway Illustration of Complex 3D Models," ACM Transactions on Graphics 26(3), SIGGRAPH 2007, Aug. 2007, 11 pages.
Lueders, "Infringement Allegations by EagleView Technologies," Feb. 10, 2009, 3 pages.
Mahajan et al., "A Theory of Frequency Domain Invariants: Spherical Harmonic Identities for BRDF / Lighting Transfer and Image Consistency," IEEE Pattern Analysis and Machine Intelligence, 30(2), Feb. 2008, 14 pages.
Mahajan et al., "A Theory of Spherical Harmonic Identities for BRDF/Lighting Transfer and Image Consistency," ECCV 2006, Graz, Austria, May 2006, 14 pages.
Mann, "Roof with a view," *Contract Journal* 431(6552):29, Nov. 23, 2005, 2 pages.
Mikhail et al., *Introduction to Modern Photogrammetry*, John Wiley & Sons, Inc., New York, 2001, 247 pages.
Miller et al., "Miller's Guide to Framing and Roofing," McGraw Hill, New York, pp. 131-136 and 162-163, 2005, 9 pages.
Minialoff, "Introduction to Computer Aided Design," Apr. 2000, 4 pages.
Noronha et al., "Detection and Modeling of Buildings from Multiple Aerial Images," Institute for Robotics and Intelligent Systems, University of Southern California, Nov. 27, 2001, 32 pages.
Noronha et al., "Detection and Modeling of Buildings from Multiple Aerial Images," *IEEE Transactions on Pattern Analysis and Machine Intelligence* 23(5):501-518, 2001, 32 pages.
Office Action received in Reexamination of U.S. Pat. No. 8,078,436 B2, Supplemental Reexamination Patent, dated Jul. 25, 2013, 72 pages.
Office Action received in Reexamination of U.S. Pat. No. 8,145,578 B2, Supplemental Reexamination Patent, dated Jul. 25, 2013, 24 pages.
Pershing et al., "Aerial Roof Estimation System and Method," Amendment in Response to Office Action received in Reexamination of U.S. Pat. No. 8,145,578 B2, Control No. 96/000,005, filed Oct. 25, 2013, 318 pages.
Pershing et al., "Aerial Roof Estimation System and Method," Amendment in Response to Office Action received in Reexamination of U.S. Pat. No. 8,078,436 B2, Control No. 96/000,004, filed Oct. 25, 2013, 229 pages.
Pershing et al., "Aerial Roof Estimation System and Method," Notice of Allowance dated Feb. 3, 2012, for U.S. Appl. No. 12/148,439, 35 pages.
Pershing et al., "Aerial Roof Estimation System and Method," Office Action dated Apr. 25, 2011, for U.S. Appl. No. 12/148,439, 52 pages.
Pershing et al., "Aerial Roof Estimation System and Method," Office Action dated Aug. 16, 2010, for U.S. Appl. No. 12/148,439, 47 pages.
Pershing et al., "Aerial Roof Estimation System and Method," Office Action dated Aug. 25, 2011, for U.S. Appl. No. 12/148,439, 77 pages.
Pershing et al., "Aerial Roof Estimation System and Method," Office Action dated Oct. 10, 2012, for U.S. Appl. No. 13/371,271, 7 pages.
Pershing et al., "Aerial Roof Estimation System and Method," Notice of Allowance dated Jul. 29, 2013, for U.S. Appl. No. 13/371,271, 15 pages.
Pershing et al., "Aerial Roof Estimation System and Method," U.S. Appl. No. 60/925,072, filed Apr. 17, 2007, 16 pages.
Pershing et al., "Aerial Roof Estimation System and Methods," Office Action dated Aug. 28, 2012, for U.S. Appl. No. 13/287,954, 12 pages.
Pershing et al., "Aerial Roof Estimation System and Methods," Office Action dated May 22, 2013, for U.S. Appl. No. 13/287,954, 25 pages.
Pershing et al., "Aerial Roof Estimation Systems and Methods," Notice of Allowance dated Oct. 14, 2011, for U.S. Appl. No. 12/253,092, 30 pages.
Pershing et al., "Aerial Roof Estimation Systems and Methods," Office Action dated May 10, 2011, for U.S. Appl. No. 12/253,092, 26 pages.

(56) References Cited

OTHER PUBLICATIONS

Pershing et al., "Automated Techniques for Roof Estimation," U.S. Appl. No. 61/197,072, filed Oct. 31, 2008, 32 pages.
Pershing et al., "Geometric Correction of Rough Wireframe Models Derived From Photographs," U.S. Appl. No. 61/300,414, filed Feb. 1, 2010, 22 pages.
Pershing, "Concurrent Display Systems ANF Methods for Aerial Roof Estimation," Notice of Allowance dated Feb. 16, 2012, for U.S. Appl. No. 12/467,250, 19 pages.
Pershing, "Concurrent Display Systems ANF Methods for Aerial Roof Estimation," Office Action dated Sep. 7, 2011, for U.S. Appl. No. 12/467,250, 14 pages.
Pershing, "Concurrent Display Systems and Methods for Aerial Roof Estimation," Office Action dated Aug. 28, 2012, for U.S. Appl. No. 13/474,504, 8 pages.
Pershing, "Concurrent Display Systems and Methods for Aerial Roof Estimation," Office Action dated Jun. 19, 2013, for U.S. Appl. No. 13/474,504, 14 pages.
Pershing, "Pitch Determination Systems and Methods for Aerial Roof Estimation," Notice of Allowance dated Feb. 16, 2012, for U.S. Appl. No. 12/467,244, 20 pages.
Pershing, "Pitch Determination Systems and Methods for Aerial Roof Estimation," Office Action for U.S. Appl. No. 13/438,288, dated Aug. 24, 2012, 8 pages.
Pershing, "Pitch Determination Systems and Methods for Aerial Roof Estimation," Office Action dated May 21, 2013, for U.S. Appl. No. 13/438,288, 11 pages.
Pershing, "Pitch Determination Systems and Methods for Aerial Roof Estimation," Office Action dated Aug. 26, 2011, for U.S. Appl. No. 12/467,244, 17 pages.
Pershing, "Systems and Methods for Estimation of Building Floor Area," U.S. Appl. No. 13/385,607, filed Feb. 3, 2012, 41 pages.
Pershing, "Systems and Methods for Estimation of Building Floor Area," U.S. Appl. No. 13/757,712, filed Feb. 1, 2013, 95 pages.
Pershing, "Systems and Methods for Estimation of Building Wall Area," U.S. Appl. No. 13/757,694, filed Feb. 1, 2013, 96 pages.
Pershing, "User Interface Techniques for Roof Estimation," U.S. Appl. No. 61/197,904, filed Oct. 31, 2008, 62 pages.
Pershing et al., Aerial Roof Estimation System and Method, Notice of Allowance, for U.S. Appl. No. 13/371,271, dated Jul. 29, 2013, 15 pages.
Pershing et al., "Automated Roof Identification Systems and Methods," Notice of Allowance for U.S. Appl. No. 12/590,131, dated Aug. 26, 2013, 9 pages.
Pershing, "Systems and Methods for Estimation of Building Floor Area," Office Action for U.S. Appl. No. 13/757,712, dated Jul. 18, 2013, 18 pages.
Pershing, "Systems and Methods for Estimation of Building Wall Area," Office Action for U.S. Appl. No. 13/757,694, dated Oct. 8, 2013, 15 pages.
Pershing, "Systems and Methods for Estimation of Building Floor Area," Notice of Allowance for U.S. Appl. No. 13/757,712, dated Nov. 25, 2013, 15 pages.
PhotoModeler, "Measuring & Modeling the Real World," retrieved Sep. 30, 2008, from http://www.photomodeler.com/products/photomodeler.htm, 2 pages.
Pictometry Online, "Government," Oct. 7, 2008, retrieved Aug. 10, 2011, from http://web.archive.org/web/20081007111115/http:/www.pictometry.com/government/prod . . . , 3 pages.
Pictometry, "Electronics Field Study™ Getting Started Guide," Version 2.7, Jul. 2007, 15 pages.
Pictometry, "FAQs," Sep. 22, 2008, retrieved on Aug. 10, 2011, from http://www.web.archive.org/web/20080922013233/http://www.pictometry.com/about_us/faqs.sht . . . , 3 pages.
Pictometry.com, "Frequently Asked Questions," May 24, 2005, retrieved Mar. 28, 2012, from URL=http://web.archive.org/web/20050524205653/http://pictometry.com/faq.asp, 9 pages.
Pictometry.com, "Frequently Asked Questions," retrieved on Apr. 9, 2011, from http://replay.waybackmachine.org/20050801231818/http:///www.pictometry.com/faq.asp, 10 pages.
Pictometry.com, "Frequently Asked Questions," retrieved on Aug. 1, 2005, from http://replay.waybackmachine.org/20050801231818/http:///www.pictometry.com/faq.asp, 10 pages.
Pictometry.com, "Frequently Asked Questions," retrieved on Feb. 10, 2012, from http://replay.waybackmachine.org/20050801231818/http:///www.pictometry.com/faq.asp, 6 pages.
Pictometry, "Frequently Asked Questions," Dec. 2006, retrieved Apr. 9, 2011, from http://replay.waybackmachine.org/20050801231818/http://www.pictometry.com/faq.asp, 10 pages.
Pictometry.com, "Pictometry Announces Software and Web-based Solution for Engineers, Architects, and Planners," Press Release, Jan. 22, 2004, 3 pages.
Poullis et al., "Photogrammetric Modeling and Image-Based Rendering for Rapid Virtual Environment Creation," http://handle.dtic.mil/100.2/ADA433420, 1998, 7 pages.
Precigeo.com, "Welcome to precigeoRoof," URL=http://web.archive.org/web/20070106063144/roof.precigeo.com, retrieved Apr. 30, 2009, 1 page.
Precigeo.com, "Welcome to precigeo™," "Welcome to precigeoRoof," "Why precigeoRoof," "How precigeoRoof Works," "How precigeoRoof Can Help Me," all retrieved on Feb. 26, 2010, from http://web.archive.org/, pp. 1-5; "Why precigeoRisk Works" and :Welcome to precigeoRisk, retrieved on Aug. 14, 2010, from http://web.archive.org, pp. 6-11, 11 pages total.
Precigeo.com, "Welcome to precigeo™," URL=http://web.archive.org/20080110074814/http://www.precigeo.com, retrieved Feb. 17, 2009, 1 page.
Precigo.com, "How precigeoRoof Works," URL=http://web.archive.org/web/20070107012311/roof.precigeo.com/how-precigeo-roof-works.htm, retrieved Apr. 30, 2009, 2 pages.
Reddy et al., "Frequency-Space Decomposition and Acquisition of Light Transport under Spatially Varying Illumination," ECCV 2012, Florence, Italy, Oct. 2012, 15 pages.
RoofCAD, "Satellite Takeoff Tutorial-Pitched Roof," received Jan. 31, 2012, 25 pages.
Scholze et al., "A Probabilistic Approach to building Roof Reconstruction Using Semantic Labeling," *Pattern Recognition* 2449/2002, Springer Berlin/Heidelberg, 2002, 8 pages.
Schutzberg et al., "Microsoft's MSN Virtual Earth: The Map is the Search Platform," *Directions Magazine*, retrieved Feb. 6, 2009, from http://www.directionsmag.com/article.php?article_id=873&try=1, 10 pages.
Seitz et al., "A Comparison and Evaluation of Multi-view Stereo Reconstruction Algorithms," CVPR 2006, New York, NY, Jun. 2006, 8 pages.
Sengül, "Extracting Semantic Building Models From Aerial Stereo Images and Convesion to Citygml," Thesis, Istanbul Technical University Institute of Science and Technology, May 2010, 138 pages.
Shan et al., "Refractive Height Fields from Single and Multiple Images," CVPR 2012, Providence, RI, Jun. 2012, 8 pages.
Shan et al., "Refractive Height Fields from Single and Multiple Images," CVPR 2012, Providence, RI, Jun. 2012, poster, 1 page.
Sorcerer software screenshot, modified on Sep. 6, 2012, 1 page.
Steuer, "Heigh Snakes: 3D Building Reconstruction from Aerial Image and Laser Scanner Data," Joint Urban Remote Sensing Event (JURSE 2011), Munich, Germany, Apr. 11-13, 2011, pp. 113-116.
University of Washington, College of Arts & Sciences, Mathematics, Course Offerings, Autumn Quarter 2013 and Winter Quarter 2014, retrieved Oct. 25, 2013, from http://www.washington.edu/students/crscat/math.html, 16 pages.
U.S. Appl. No. 60/425,275, filed Nov. 8, 2002, 32 pages.
Wattenberg et al., "Area, Volume, and Torque in Three Dimensions," retrieved on Sep. 24, 2013, from http://www.math.montana.edu/frankw/ccp/multiworld/twothree/atv/learn.htm, 14 pages.
Weeks et al., "A Real-Time, Multichannel System with Parallel Digital Signal Processors," *Proceedings of IEEE International Conference on Acoustics, Speech and Signal Processing* (*ICASSP* 1990) 3: 1787-1790, Apr. 1990.
Wolf, *Elements of Photogrammetry*, McGraw-Hill Kogakusha, 1974, "Chapter Fourteen: Aerotriangulation; 41-1 Introduction," pp. 351-352, 3 pages.

(56) References Cited

OTHER PUBLICATIONS

Wood et al., "Surface Light Fields for 3D Photography," SIGGRAPH 2000, New Orleans, LA, Jul. 24-28, 2000, 10 pages.
Written Opinion for International Application No. PCT/US11/23408, dated Aug. 11, 2011, 5 pages.
Written Opinion for International Application No. PCT/US2013/023503, dated Apr. 30, 2013, 4 pages.
Written Opinion for International Application No. PCT/US2013/023502, dated Apr. 30, 2013, 3 pages.
Wu et al., "Multicore Bundle Adjustment," CVPR 2011, Colorado Springs, CO, Jun. 2011, 8 pages.
Wu et al., "Schematic Surface Reconstruction," CVPR 2012, Providence, RI, Jun. 2012, 1 page.
www.archive.org Web site showing alleged archive of PhotoModeler Web Site http://www.photomodeler.com/pmpro08.html from Feb. 9, 2006 (retrieved Oct. 21, 2013), 4 pages.
www.archive.org Web site showing alleged archive of German Aerowest Web Site http://aerowest.de/ from Feb. 6, 2006 (retrieved Sep. 20, 2012) and translated to English, 61 pages.
www.archive.org Web site showing alleged archive of German AeroDach Web Site http://www.areodach.de from Jun. 13, 2004 (retrieved Sep. 20, 2012) and translations to English, 21 pages.
YouTube, "Pictometry Online Demo," retrieved on Feb. 6, 2006, from http://www.youtube.com/watch?v=jURSKo0OD0, 1 page.
YouTube, "Pictometry Online Webinar for MAIA Members," uploaded Apr. 8, 2011, retrieved from http://www.youtube.com/watch?v=RzAXK2avqQQ, 2 pages.
Zhang et al., "Rapid Shape Acquisition Using Color Structured Light and Multi-Pass Dynamic Programming," International Symposium on 3D data Processing Visualization and Transmission, Padova, Italy, Jun. 2002, 13 pages.
Zhang et al., "Shape and Motion Under Varying Illumination: Unifying Structure from Motion, Photometric Stereo, and Multi-view Stereo," ICCV 2003, Nice, France, Oct. 2003, 8 pages.
Zhang et al., "Spacetime Stereo: Shape Recovery for Dynamic Scenes," CVPR 2003, Madison, Wisconsin, Jun. 2003, 8 pages.
Zheng et al., "A Consistent Segmentation Approach to Image-based Rendering," Technical Report CSE-09-03-02, 2002, 8 pages.
Zheng et al., "Parallax Photography: Creating 3D Cinematic Effects form Stills," Proceedings of Graphics Interface 2009, Kelowna, BC, CA, May 2009, 8 pages.
Ziegler et al., "3D Reconstruction Using Labeled Image Regions," Mitsubishi Research Laboratories, http://www.merl.com, Jun. 2003, 14 pages.
Zongker et al., "Environment Matting and Compositing," SIGGRAPH '99, Los Angeles, CA, Aug. 9-13, 1999, 10 pages.
Transcription of points of potential interest in the attached YouTube video titled: "Pictometry Online Demo," retrieved on Feb. 10, 2010, 1 page.
YouTube, "Pictometry Online Demo," DVD, Feb. 25, 2010.

\* cited by examiner

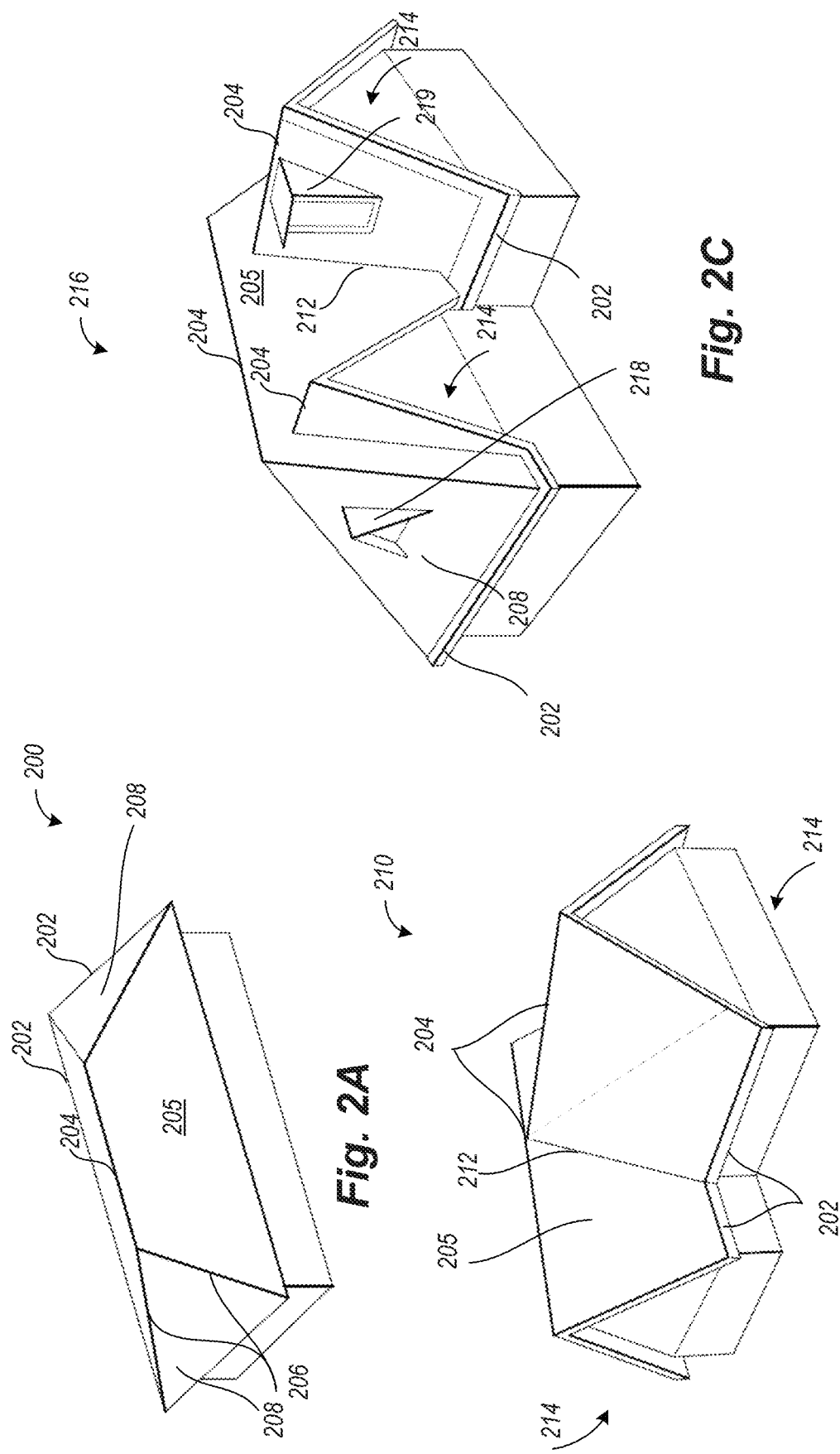

| 3-Tab Shingles | | | | | | | | | | | | Standard Waste% as estimated in the industry | | Waste % Calculated by the Inventive Technique | | |
|---|---|---|---|---|---|---|---|---|---|---|---|---|---|---|---|---|
| Type | size | pitch | Squares | Eave | Hips | Rakes | Ridges | Valleys | Perimeter | Wall | Trans | WF | Sq. +waste | WF | Sq. +waste | SQ. FT. Difference |
| Single Gable | 20'x40' | 6 | 8.94 | 80 | 0 | 44.72 | 40 | 0 | 124.72 | | 0 | 5% | 9.39 | 8.72% | 9.72 | 77.95 | 3.72% |
| | 30'x60' | 6 | 20.12 | 120 | 0 | 67.08 | 60 | 0 | 187.08 | | 0 | 5% | 21.13 | 5.81% | 21.29 | 116.93 | 0.81% |
| | 35'x70' | 6 | 27.39 | 140 | 0 | 78.26 | 70 | 0 | 218.26 | | 0 | 5% | 28.76 | 4.98% | 28.75 | 136.41 | -0.02% |
| | 40'x80' | 6 | 35.78 | 160 | 0 | 89.44 | 80 | 0 | 249.44 | | 0 | 5% | 37.57 | 4.36% | 37.34 | 155.90 | -0.64% |
| Single Gable 50% cross gable added | 20'x40' | 6 | 11.18 | 80 | 0 | 67.27 | 59.92 | 29.88 | 147.27 | | 0 | 10% | 12.30 | 16.04% | 12.97 | 179.32 | 6.04% |
| | 30'x60' | 6 | 25.17 | 120 | 0 | 100.68 | 89.94 | 44.88 | 220.68 | | 0 | 10% | 27.69 | 10.69% | 27.86 | 269.04 | 0.69% |
| | 35'x70' | 6 | 34.25 | 140 | 0 | 117.54 | 104.94 | 52.38 | 257.54 | | 0 | 10% | 37.68 | 9.17% | 37.39 | 313.98 | -0.83% |
| | 40'x80' | 6 | 44.72 | 160 | 0 | 134.36 | 119.92 | 59.88 | 294.36 | | 0 | 10% | 49.19 | 8.02% | 48.31 | 358.87 | -1.98% |
| Hip Roof | 20'x40' | 6 | 8.94 | 120 | 60 | 0 | 20 | 0 | 120.00 | | 0 | 14% | 10.19 | 16.81% | 10.44 | 150.25 | 2.81% |
| | 30'x60' | 6 | 20.12 | 180 | 90 | 0 | 30 | 0 | 180.00 | | 0 | 14% | 22.94 | 11.20% | 22.37 | 225.38 | -2.80% |
| | 35'x70' | 6 | 27.39 | 210 | 105 | 0 | 35 | 0 | 210.00 | | 0 | 14% | 31.22 | 9.60% | 30.02 | 262.94 | -4.40% |
| | 40'x80' | 6 | 35.78 | 240 | 120 | 0 | 40 | 0 | 240.00 | | 0 | 14% | 40.79 | 8.40% | 38.79 | 300.50 | -5.60% |
| Hip roof with 50% cross gable added | 20'x40' | 6 | 11.18 | 140.09 | 75 | 0 | 29.92 | 14.94 | 140.09 | | 0 | 14% | 12.75 | 20.14% | 13.43 | 225.15 | 6.14% |
| | 30'x60' | 6 | 25.17 | 210.26 | 112.52 | 0 | 44.94 | 22.44 | 210.26 | | 0 | 14% | 28.69 | 13.42% | 28.55 | 337.90 | -0.58% |
| | 35'x70' | 6 | 34.24 | 245.03 | 131.25 | 0 | 52.43 | 26.19 | 245.03 | | 0 | 14% | 39.03 | 11.53% | 38.18 | 394.19 | -2.49% |
| | 40'x80' | 6 | 44.73 | 280.12 | 150.06 | 0 | 59.9 | 29.95 | 280.12 | | 0 | 14% | 50.99 | 10.07% | 49.24 | 450.65 | -3.93% |

*Fig. 7*

| Dimensional Shingles | | | | | | | | | | | | Standard Waste% as estimated in the industry | | Waste % Calculated by the Inventive Technique | | | |
|---|---|---|---|---|---|---|---|---|---|---|---|---|---|---|---|---|---|
| Type | size | pitch | Squares | Eave | Hips | Rakes | Ridges | Valleys | Perimeter | Wall Trans | W.F. | Sq. +waste | W.F. | Sq. +waste | SQ. FT. | Difference |
| Single Gable | 20'x40' | 6 | 8.94 | 80 | 0 | 44.67 | 40 | 0 | 124.67 | 0 | 5% | 9.39 | 8.71% | 9.72 | 77.92 | 3.71% |
|  | 30'x60' | 6 | 17.89 | 120 | 0 | 67.00 | 60 | 0 | 187.00 | 0 | 5% | 18.78 | 6.53% | 19.05 | 116.87 | 1.53% |
|  | 35'x70' | 6 | 26.83 | 140 | 0 | 77.67 | 70 | 0 | 217.67 | 0 | 5% | 28.17 | 5.07% | 28.19 | 136.04 | 0.07% |
|  | 40'x80' | 6 | 35.77 | 160 | 0 | 89.33 | 80 | 0 | 249.33 | 0 | 5% | 37.56 | 4.36% | 37.33 | 155.83 | -0.64% |
| Single Gable 50% cross gable added | 20'x40' | 6 | 11.18 | 60 | 0 | 66.99 | 60 | 30 | 126.99 | 0 | 10% | 12.30 | 16.05% | 12.97 | 179.49 | 6.05% |
|  | 30'x60' | 6 | 22.36 | 90 | 0 | 100.49 | 90 | 45 | 190.49 | 0 | 10% | 24.60 | 12.04% | 25.05 | 269.24 | 2.04% |
|  | 35'x70' | 6 | 33.54 | 112.5 | 0 | 125.61 | 112.5 | 56.25 | 238.11 | 0 | 10% | 36.89 | 10.03% | 36.91 | 336.55 | 0.03% |
|  | 40'x80' | 6 | 44.72 | 120 | 0 | 133.98 | 120 | 60 | 253.98 | 0 | 10% | 49.19 | 8.03% | 48.31 | 358.99 | -1.97% |
| Hip Roof | 20'x40' | 6 | 8.94 | 120 | 60 | 0 | 30 | 0 | 120.00 | 0 | 14% | 10.19 | 17.64% | 10.52 | 157.74 | 3.64% |
|  | 30'x60' | 6 | 17.89 | 180 | 90 | 0 | 45 | 0 | 180.00 | 0 | 14% | 20.39 | 13.23% | 20.25 | 236.61 | -0.77% |
|  | 35'x70' | 6 | 26.83 | 225 | 112.5 | 0 | 56.25 | 0 | 225.00 | 0 | 14% | 30.58 | 11.02% | 29.79 | 295.76 | -2.98% |
|  | 40'x80' | 6 | 35.77 | 240 | 120 | 0 | 60 | 0 | 240.00 | 0 | 14% | 40.78 | 8.82% | 38.92 | 315.48 | -5.18% |
| Hip roof with 50% cross gable added | 20'x40' | 6 | 11.18 | 140 | 75 | 0 | 30 | 15 | 140.00 | 0 | 14% | 12.75 | 19.60% | 13.37 | 219.11 | 5.60% |
|  | 30'x60' | 6 | 22.36 | 210 | 112.5 | 0 | 45 | 22.5 | 210.00 | 0 | 14% | 25.49 | 14.70% | 25.65 | 328.67 | 0.70% |
|  | 35'x70' | 6 | 33.54 | 262.5 | 140.625 | 0 | 56.25 | 28.125 | 262.50 | 0 | 14% | 38.24 | 12.25% | 37.65 | 410.84 | -1.75% |
|  | 40'x80' | 6 | 44.72 | 280 | 150 | 0 | 60 | 30 | 280.00 | 0 | 14% | 50.98 | 9.80% | 49.10 | 438.23 | -4.20% |

*Fig. 8*

BUILDING MATERIALS ESTIMATION

BACKGROUND

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Field of the Invention

This invention relates to automated systems and methods for estimation of building materials needed for construction or repair and, in particular, to obtain more accurate calculation of materials for roofs or walls of buildings having complex architectural features.

Description of the Related Art

When a roof on a building needs to be repaired or replaced, typically a roofing company or an insurance company sends an estimator to the building site to evaluate the cost of materials and labor to complete the work. Estimators may assess the shape of the roof, measure certain roof lines, and count the number of architectural features that the roof includes, such as gables, hips, valleys, dormers, and the like. Once the dimensions and the shape are known, the estimator may price the roofing material, for example, composition shingles, wood shingles, wood shakes, sheet metal, metal tiles, clay tiles, and the like. Based on the size and shape of the roof and the roofing material, a rough estimate can be calculated.

In addition to this estimate, a standard overage amount is calculated. This overage is called the "waste" in the roofing markets. The overage is usually within the range of about 5% to 25%, to account for wasted materials that must be cut and discarded.

It is important that some amount of overage be calculated in ordering roofing materials for a number of reasons. A first reason is that if the roof is nearly done and the roofing materials run out, then it is necessary to have someone purchase and then deliver the additional needed roof material to the roofing site. This may take one to two days and, if the roofing crew has a tight schedule, this may substantially delay the completion of the roof. In addition, if there is inclement weather, such as rain or snow, when the roof is incomplete, this may cause substantial damage to the structure which could have been avoided had sufficient roofing material been delivered initially. In addition, it is desirable that all the roofing material be delivered in a single drop shipment. This can save considerable cost and time over multiple deliveries of roofing material as the roof is completed. Of course, if too much roofing material is ordered, then there is an additional cost to the roof repair or replacement. While it would be possible to ensure that sufficient roof material is provided by always ordering 25%-40% more than the calculated square area of the roof, this would result in a substantial waste and discard of roofing material. This is because typically, when the roofing job is finished, all material left onsite is discarded. It is very difficult to return the unused material for future use at a different construction site. This would result in substantial additional costs in transportation of the material, and potential damage to the roofing materials. Furthermore, a second buyer may not be willing to pay the full cost for roofing material which was delivered to a prior job and not used. Accordingly, any amount of overage which is ordered and not used is usually discarded and results in lost money. It is, therefore, preferred to estimate as accurately as possible the exact amount of material truly needed to complete the roof job, thus being assured that sufficient roof material is delivered in a first shipment so that a second shipment of roofing material is not needed.

Estimates of roofing material overage depend very much on the skill and experience of the roofing contractor who is ordering the roofing material. In a straightforward example, the contractor who is ordering the roofing material can simply add a percentage to the square footage of the roof. For example, if the roof is 2,200 sq. ft., the roofing contractor can simply estimate that a 10% overage is needed to ensure proper coverage of the roof, and order 10% more than the actual square footage of the roof. Unfortunately, in some cases an additional 10% of material is insufficient to cover the roof, while in other cases there will be significantly more than is needed, resulting in wasted roofing material and more expense than is needed. Therefore, the skill of the roofing contractor and his personal judgment are significant factors in deciding how much additional roofing material is required in order to provide an accurate estimate. In many cases, an experienced roofing contractor will take into account the shape of a roof in trying to make an accurate estimate of the amount overage which is required. For example, a hipped roof may be assigned a standard 22% overage, while a gable roof may be assigned a standard 10% overage. In general, the more lines a roof has, the more cuts a roofing contractor will believe is necessary and the more waste will be generated. Thus, a geometrically complex roof tends to incur more waste than a basic roof.

There are additional factors, however, that determine a correct overage percentage. One factor is the size of the roof. Smaller roofs require more material cuts as a percentage of the overall roof area. Therefore, a small roof tends to incur more wasted material than a large roof, on a percentage basis. Another factor is the size of the material used relative to the lengths of the roof lines. In a simplified example, if three-foot long roof shingles are used to cover nine lineal feet, there should be no waste. However, if the three-foot long shingles are used to cover ten lineal feet, two thirds of the last shingle will be cut and potentially wasted. It is possible that cut portions may be re-used, depending on their size. Therefore, re-use is another factor that affects the overage. In addition, different product types vary significantly in their unit size. For example, while composite shingles are typically 36 inches long and 12 inches high, wood shakes typically measure 24 inches×6 inches. However, the exposed height for either product type, as required by building codes, is typically only 5 inches. Therefore, the type of material can greatly affect the actual amount of material wasted.

The conventional practice of roof estimation omits consideration of such factors (e.g., relative roof dimensions, materials used, and re-use) and focuses only on roof shape. As a consequence, there has been a tendency to over-estimate the overage required, which increases the cost to the consumer (e.g., the homeowners or insurance companies who are paying for the job). When many roof replacements are needed at once, for example, in the wake of a hurricane, earthquake, hail storm, flood, or other natural disaster, the increased overage cost multiplies and becomes a significant burden for building insurers.

In addition to repairs, design decisions for new construction are influenced by roof construction costs. Even though it may appear at first that one particular roofing material product is more expensive than another, the final costs may be the same once the complexity of the roof geometry and the relationship of the geometry to the material unit dimensions is taken into account. To the extent that a construction cost estimate, including overage estimates, is inaccurate, a consumer may make an uninformed decision regarding roof type, roof materials, or even overall building design.

The result is that the accuracy of an overage estimate can depend very greatly on the experience and skill of the roofing contractor, as well as that individual's experience with the different types of roofing materials, the particular roofing material to be used for the current job, and whether the roofing contractor works for the homeowner, an insurance company, a new builder, or a material supply company, (e.g., Home Depot or Lowes).

The skill and experience of roofing contractors varies greatly from one individual to another and therefore it becomes very difficult to be assured that the correct amount of roofing material will be ordered with a sufficient overage to complete the roof as a single job, but not so much overage that a large amount of roofing material is wasted.

For at least these reasons, an accurate method of overage estimation of roof materials would benefit roof selection, building design, and roof repair/replacement.

BRIEF SUMMARY

Recently, it has become possible to improve the accuracy of roof measurements through remote image acquisition, using a computer-based roof estimation system. Thus, it is now possible to obtain actual roof dimensions and generate a roof estimation report without relying on a human estimator to be present at a building site. Even if a building is significantly damaged, satellite photos or aerial images saved in a database can provide accurate views of the building as it was, prior to a damage incident. Furthermore, if two or more current or previous views of the same roof are available, for example, an orthogonal (top plan) view and at least one oblique (perspective) view, a 3D image of the roof can be computer-generated. Such a 3D rendering allows obtaining actual dimensions of a complex roof that can be used to accurately calculate material costs. Such methods are described in U.S. Pat. Nos. 8,088,436 and 8,170,840.

As described below, actual roof dimensions can then be used to provide a fully computer-generated estimate of the material overage needed. Instead of simply applying a generic percentage based on roof shape, this computer-based approach can take into account more of the relevant factors, including the number of roof lines as a percentage of total roof area. The resulting computer-generated estimate is shown to be more accurate, less expensive, and faster than using a human on-site estimator. A computational method for estimating building materials overage can be summarized as including the acts of receiving a data set derived from image data of a roof; extracting linear dimensions of each type of roof feature (e.g., number of linear feet of ridges, rakes, eaves, valleys, flashing, and the like), and accumulating a sum of lineal feet for each feature type which corresponds to one or more cut lines; optionally computing an estimate of construction materials needed; computing a materials overage estimate; receiving a selected product unit size; adjusting the materials overage estimate based on the selected product; and outputting the overage estimate to a report generation engine.

Embodiments of a method of computing a materials overage amount include a model that takes into account different worst case waste factors for the amount and type of each roof feature present; and a calculation that takes into account actual waste incurred during installation of the building material.

BRIEF DESCRIPTION OF THE DRAWINGS

FIG. 2A is an exemplary isometric view showing geometry of a basic hipped roof.

FIG. 2B is an exemplary isometric view showing geometry of a basic gabled roof.

FIG. 2C is an exemplary isometric view showing geometry of a roof that combines different features.

FIGS. 7 and 8 are spreadsheets that illustrate a method of computing a materials overage amount by applying weighting factors to accumulated feature dimensions of a roof, as described herein.

DETAILED DESCRIPTION

Embodiments described herein provide enhanced computer- and network-based methods, techniques, and systems for building structure estimation employing perspective imagery from independent sources.

Figure 1:
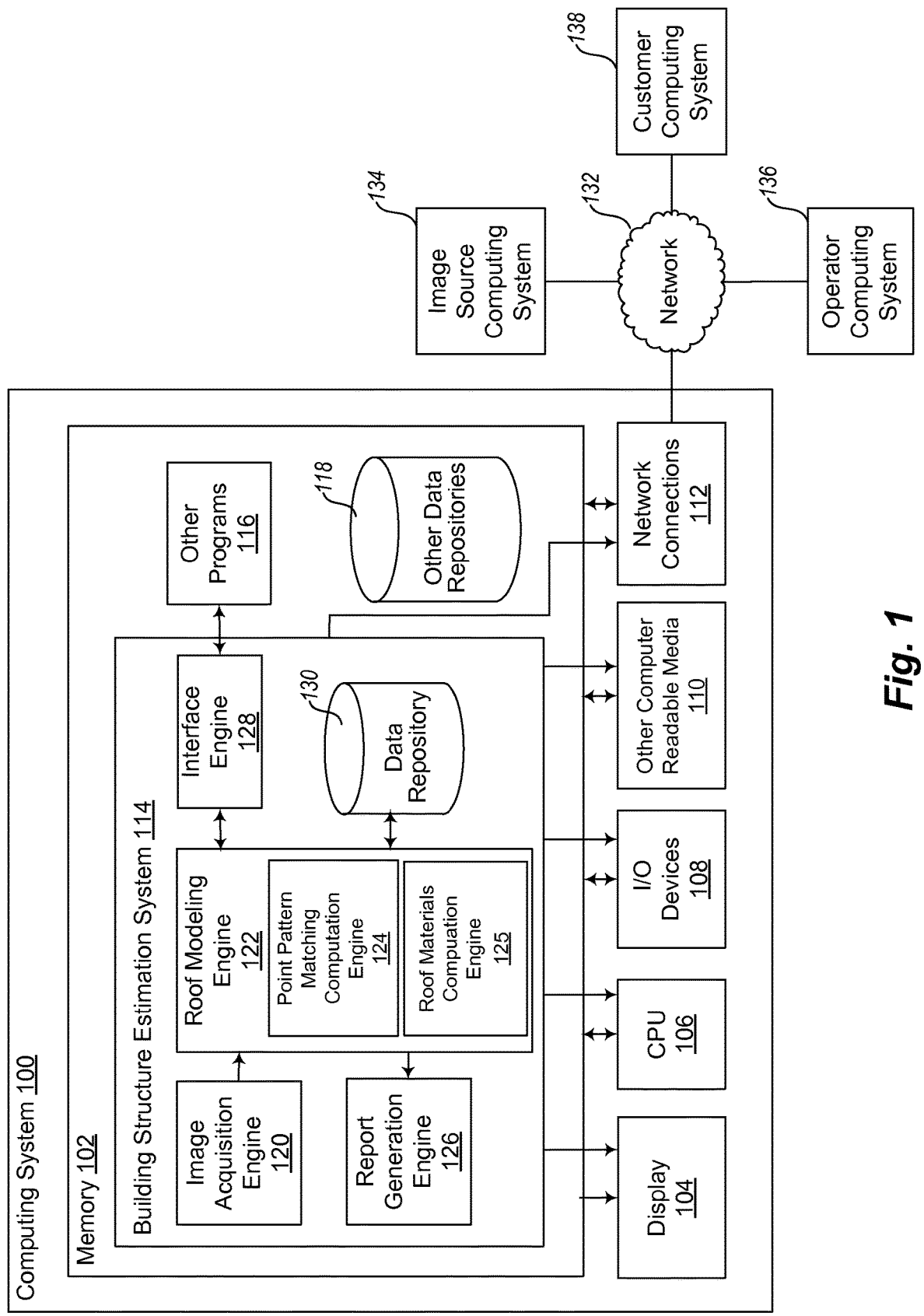
FIG. 1 is a block diagram of a computing system for practicing embodiments of a roofing material overage estimation method presented herein, according to one embodiment.

FIG. 1 is an example block diagram of a computing system 100 for practicing embodiments of the statistical point pattern matching method described herein, and for practicing embodiments of a building structure estimation system based on the point pattern matching, according to one embodiment.

One or more general purpose or special purpose computing systems may be used to implement the computer- and network-based methods, techniques, and systems for point pattern matching computation described herein and for practicing embodiments of a building structure estimation system based on the point pattern matching. More specifically, the computing system 100 may comprise one or more distinct computing systems present at distributed locations. In addition, each block shown may represent one or more such blocks as appropriate to a specific embodiment or may be combined with other blocks. Moreover, in one example embodiment, the various components of a Building structure estimation system 114 may physically reside on one or more machines, which use standard inter-process communication mechanisms (e.g., TCP/IP) to communicate with each other. Further, the Building structure estimation system 114 may be implemented in software, hardware, firmware, or in some combination to achieve the capabilities described herein.

Examples of computing systems and methods to obtain a roof report are shown and described in detail in U.S. Pat. Nos. 8,078,436 and 8,170,840 and these can be used as one component of the present embodiment, as well as other roof report generation systems. For completeness, one potential system for creating such a report will be described herein as follows.

In the embodiment shown, the computing system 100 comprises a computer memory ("memory") 102, a display 104, one or more Central Processing Units ("CPU") 106, Input/Output devices 108 (e.g., keyboard, mouse, joystick, track pad, CRT or LCD display, and the like), other computer-readable media 110, and network connections 112. A building structure estimation system 114 is shown residing in the memory 102. In other embodiments, some portion of the contents or some or all of the components of the building structure estimation system 114 may be stored on and/or transmitted over the other computer-readable media 110. The components of the building structure estimation system 114 preferably execute on one or more CPUs 106 and generate roof estimate reports, as described herein. Other code or programs 116 (e.g., a Web server, a database management system, and the like) and potentially other data repositories, such as data repository 118, also reside in the memory 102, and preferably execute on one or more CPUs 106. Not all of the components in FIG. 1 are required for each implementation. For example, some embodiments embedded in other software do not provide means for user input, for display, for a customer computing system, or other components. Currently, some inputs to the building structure estimation system 114 are computer-generated, while other inputs may be entered manually to supplement machine-generated or machine-processed data. Further computerization of the building structure estimation system, including computerization of roof materials overage estimation is a goal addressed by the method described herein, along with other methods.

In a typical embodiment, the building structure estimation system 114 includes an image acquisition engine 120; a roof modeling engine 122; a point pattern matching computation engine 124, and a roof materials computation engine 125 within, or as part of, the roof modeling engine 122; a report generation engine 126, an interface engine 128, and a data repository 130. Other and/or different modules may be implemented. In addition, the building structure estimation system 114 interacts via a network 132 with an image source computing system 134, an operator computing system 136, and/or a customer computing system 138. Communication system 132 may utilize one or more protocols to communicate via one or more physical networks, including local area networks, wireless networks, dedicated lines, intranets, the Internet, and the like.

The image acquisition engine 120 performs at least some of the functions described herein, with respect to the processes described herein. In particular, the image acquisition engine 120 interacts with the image source computing system 134 to obtain one or more images of a building, and stores those images in the building structure estimation system data repository 130 for processing by other components of the building structure estimation system 114.

The roof modeling engine 122 performs at least some of the functions described with reference to FIGS. 2-13 below. In particular, the roof modeling engine 122 generates a model based on one or more images of a building that are obtained from the building structure estimation system data repository 130 or directly from the image source computing system 134. As noted, model generation may be computer-assisted, based on at least some inputs received from the operator computing system 136.

In addition, at least some aspects of the model generation may be performed by microprocessor-based devices. In particular, to generate a 3D model, the roof modeling engine 122 may use output from the point pattern matching computation engine 124 which employs variational analysis to compute a point-to-point probability spread function. The point-to-point probability spread function can be used to estimate which individual points on one image of the building most likely match corresponding points on another image of the building (i.e., the point pattern matching computation engine endeavors to "optimize" point matching associations). This estimation may be based on adaptive predominance voting probabilities generated from shape pattern matches. The shape pattern matches can be created by comparing combinations of points on an orthogonal view of the building with specific other points on an oblique view of the building, and as further described herein.

Such computerized and/or computer-assisted techniques are further described with respect to FIGS. 2-13 below. After the roof modeling engine 122 generates a model, it can store the generated model in the building structure estimation system data repository 130 for further processing by other components of the building structure estimation system 114.

The report generation engine 126 generates roof reports based on models stored in the building structure estimation system data repository 130. Generating a roof report may include preparing one or more views of a 3D model of the roof, annotating those views with indications of various characteristics of the model, such as dimensions of roof features (e.g., ridges, valleys, gables, hips, and the like), slopes of sections of the roof, calculated surface areas of sections of the roof, etc. In some embodiments, the report generation engine 126 facilitates transmission of roof measurement information that may or may not be incorporated into a roof estimate report. For example, the report generation engine 126 may transmit roof measurement information based on, or derived from, models stored in the building structure estimation system data repository 130. Such roof measurement information may be provided to, for example, third-party systems that generate roof estimate reports based on the provided information.

The interface engine 128 provides a view and a controller that facilitate user interaction with the building structure estimation system 114 and its various components. For example, the interface engine 128 may implement a user interface engine. The user interface engine may provide an interactive graphical user interface (GUI) that can be used by a human user operating the operator computing system 136 to interact with, for example, the roof modeling engine 122, to perform functions such as specifying regions of interest for computer-based roof detection, specifying and/or identifying specific points on images of buildings, etc. In at least some embodiments, access to the functionality of the interface engine 128 is provided via a Web server, possibly executing as one of the other programs 116.

In some embodiments, the interface engine 128 provides programmatic access to one or more functions of the building structure estimation system 114. For example, the interface engine 128 provides a programmatic interface (e.g., as a Web service, static or dynamic library, etc.) to one or more roof estimation functions of the building structure estimation system 114 that may be invoked by one of the other programs 116 or some other module. In this manner, the interface engine 128 facilitates the development of third-party software, such as user interfaces, plug-ins, adapters (e.g., for integrating functions of the building structure estimation system 114 into desktop applications, Web-based applications, mobile device applications, embedded applications, etc.), and the like. In addition, the interface engine 128 may be, in at least some embodiments, invoked or otherwise accessed via remote entities, such as the operator computing system 136, the image source computing system 134, and/or the customer computing system 138, to access various roof estimation functionality of the building structure estimation system 114.

The building structure estimation system data repository 130 stores information related to the roof estimation functions performed by the building structure estimation system 114. Such information may include image data, model data, and/or report data. Furthermore, the data repository 130 may include information related to computerized roof detection and/or image registration. Such information includes, for example, historical image data. In addition, the building structure estimation system data repository 130 may include information about customers, operators, or other individuals or entities associated with the building structure estimation system 114.

In an example embodiment, components/modules of the building structure estimation system 114 can be implemented using standard programming techniques. For example, the building structure estimation system 114 may be implemented as a "native" executable running on the CPU 106, along with one or more static or dynamic libraries. In other embodiments, the building structure estimation system 114 can be implemented as instructions processed by a virtual machine that executes as one of the other programs 116. In general, a range of programming languages known in the art may be employed for implementing such example embodiments, including representative implementations of various programming language paradigms, including but not limited to, object-oriented languages (e.g., Java, C++, C#, Matlab, Visual Basic.NET, Smalltalk, and the like), functional languages (e.g., ML, Lisp, Scheme, and the like), procedural languages (e.g., C, Pascal, Ada, Modula, and the like), scripting languages (e.g., Perl, Ruby, Python, JavaScript, VBScript, and the like), and declarative languages (e.g., SQL, Prolog, and the like). Portions of the building structure estimation system 114, including the roof materials computation engine 125, may simply be implemented as files or macros within a spreadsheet processing program such as, for example, Microsoft Excel™.

The embodiments described above may also use well-known synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multi-threading, client-server, or peer-to-peer, running on one or more computer systems each having one or more CPUs. Some embodiments execute concurrently and asynchronously, and communicate using message passing techniques. Equivalent synchronous embodiments are also supported by a building structure estimation system implementation. Also, other functions could be implemented and/or performed by each component/module, and in different orders, and by different components/modules, yet still achieve the functions of the building structure estimation system 114.

In addition, programming interfaces to the data stored as part of the building structure estimation system 114, such as in the building structure estimation system data repository 130, can be available by standard mechanisms such as through C, C++, C#, and Java APIs; libraries for accessing files, databases, or other data repositories; through scripting languages such as XML; or through Web servers, FTP servers, or other types of servers providing access to stored data. For example, the building structure estimation system data repository 130 may be implemented as one or more database systems, file systems, memory buffers, or any other technique for storing such information, or any combination of the above, including implementations using distributed computing techniques.

Also, the example building structure estimation system 114 can be implemented in a distributed environment comprising multiple, even heterogeneous, computer systems and networks. For example, in one embodiment, the image acquisition engine 120, the roof modeling engine 122, the report generation engine 126, the roof materials computation engine 125, the interface engine 128, and the data repository 130 are all located in physically different computer systems. In another embodiment, various modules of the building structure estimation system 114, including the point pattern matching computation engine 124, are hosted each on a separate server machine and are remotely located from the tables which are stored in the data repository 130. Also, one or more of the modules may themselves be distributed, pooled or otherwise grouped, such as for load balancing, reliability or security reasons. Different configurations and locations of programs and data are contemplated for use with techniques of described herein. A variety of distributed computing techniques are appropriate for implementing the components of the illustrated embodiments in a distributed manner including, but not limited to, TCP/IP sockets, RPC, RMI, HTTP, Web Services (XML-RPC, JAX-RPC, SOAP, and the like).

Furthermore, in some embodiments, some or all of the components of the building structure estimation system 114 are implemented or provided in other manners, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), and the like. Some or all of the system components and/or data structures may also be stored (e.g., as software instructions or structured data) on a computer-readable medium, such as a hard disk, a memory, a network, or a portable media article to be read by an appropriate drive or via an appropriate connection. The system components and data structures may also be stored as data signals (e.g., by being encoded as part of a carrier wave or included as part of an analog or digital propagated signal)

on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

FIG. 2A shows a simple hipped roof 200. Architectural features of the simple hipped roof 200 include eaves 202, a ridge 204, hip sides 205, hip 206, and hip ends 208. The eaves 202 are lower edges of a roof that typically overhang walls of a building, to which gutters may be attached for water drainage. The ridge 204 is generally the highest feature of a roof, from which roof sections slope downward. The sides 205 are typically the largest sloping roof sections. The hips 206 are convex edges at which adjacent sections of the roof are joined. The hip ends 208 are sloping roof sections at the ends of a roof or a roof portion.

FIG. 2B shows a simple gabled roof 210. Architectural features of the simple gabled roof 210 include eaves 202, ridges 204, sides 205, valleys 212, and gables 214. The valleys 212 are concave edges at which adjacent sections of the roof are joined. The gables 214 are pointy end features that have sloping edges.

FIG. 2C shows a combination roof 216 that combines different types of roof features. Architectural features of the combination roof 216 include eaves 202, ridges 204, sides 205, hips 206, hip ends 208, valleys 212, gables 214, and one or more dormers 218, 219. The dormers 218, 219 are features that project outward from a sloping roof and typically hold a window. The dormer 218 includes a gable whereas the dormer 219 does not. The combination roof 216 exemplifies a relatively small but complex roof having a variety of different features, each of which has associated with it various cut lines. Other features, in addition to architectural features, that may influence roofing materials needed can include, for example, chimneys, skylights, vents, utility pipes, or other features that puncture the roof and require additional cuts. The combination roof 216 represents a particularly good target for application of a computer-based materials overage estimation method as described herein.

Figure 3B:
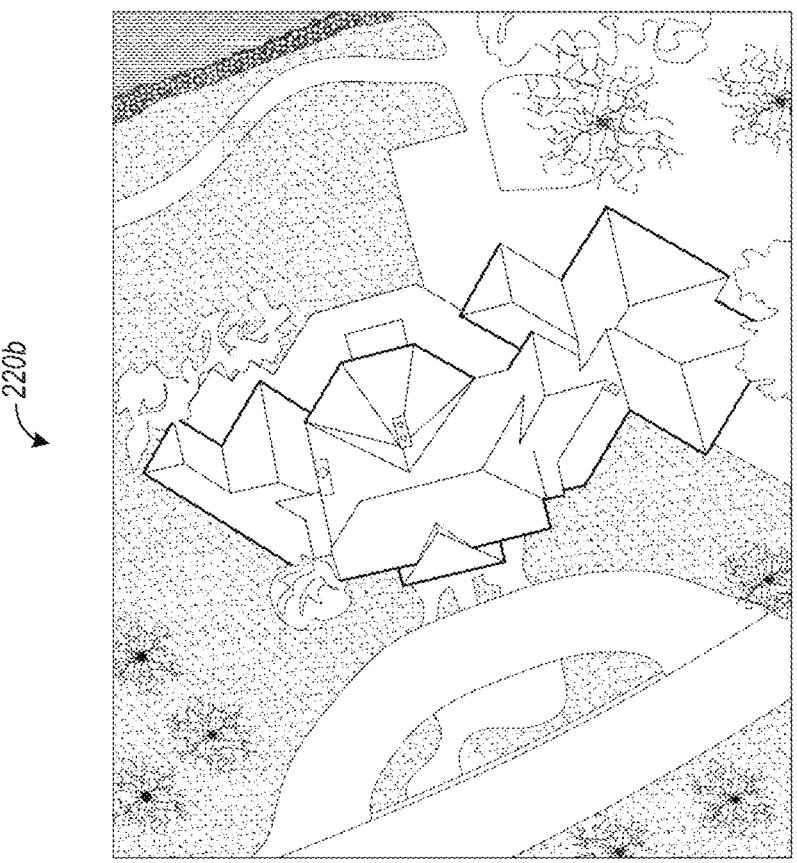
FIG. 3B is an exemplary top plan (orthogonal) view of the complex roof shown in FIG. 3A, derived from an aerial photograph.
Figure 3A:
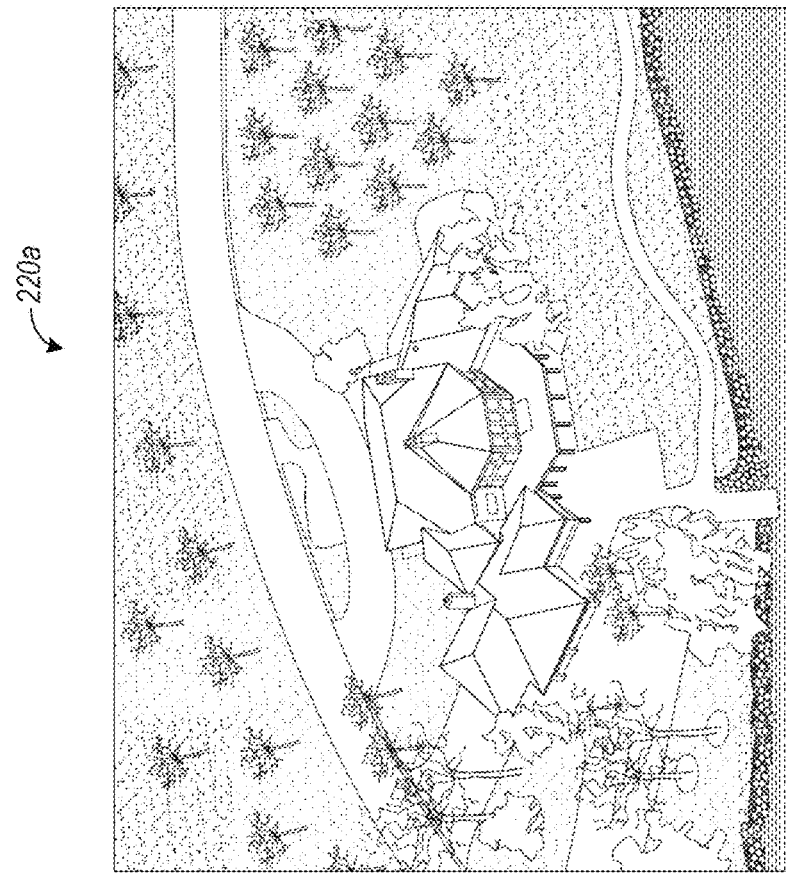
FIG. 3A is an exemplary perspective (oblique) view of a complex roof, derived from an aerial photograph.

FIGS. 3A and 3B show a large complex hipped roof. The large complex hipped roof is another example of a roof for which a computer-based materials overage estimation method, as described herein, would be of particular benefit. FIG. 3A shows a perspective (oblique) view 220a of the large complex hipped roof, while FIG. 3B shows an overhead (orthogonal) view 220b of the large complex hipped roof, both of which are derived from aerial photographs in this example. The image acquisition engine 120 can receive such aerial photographs and save them in the data repository 130. The roof modeling engine 122 can then process the different aerial views to provide data to the report generation engine 126. The report generation engine 126 can then output a roof report 224 that contains calculated measurements of roof features. Such computer-generated roof feature measurements are typically accurate to within 1%-2%.

Figure 4:
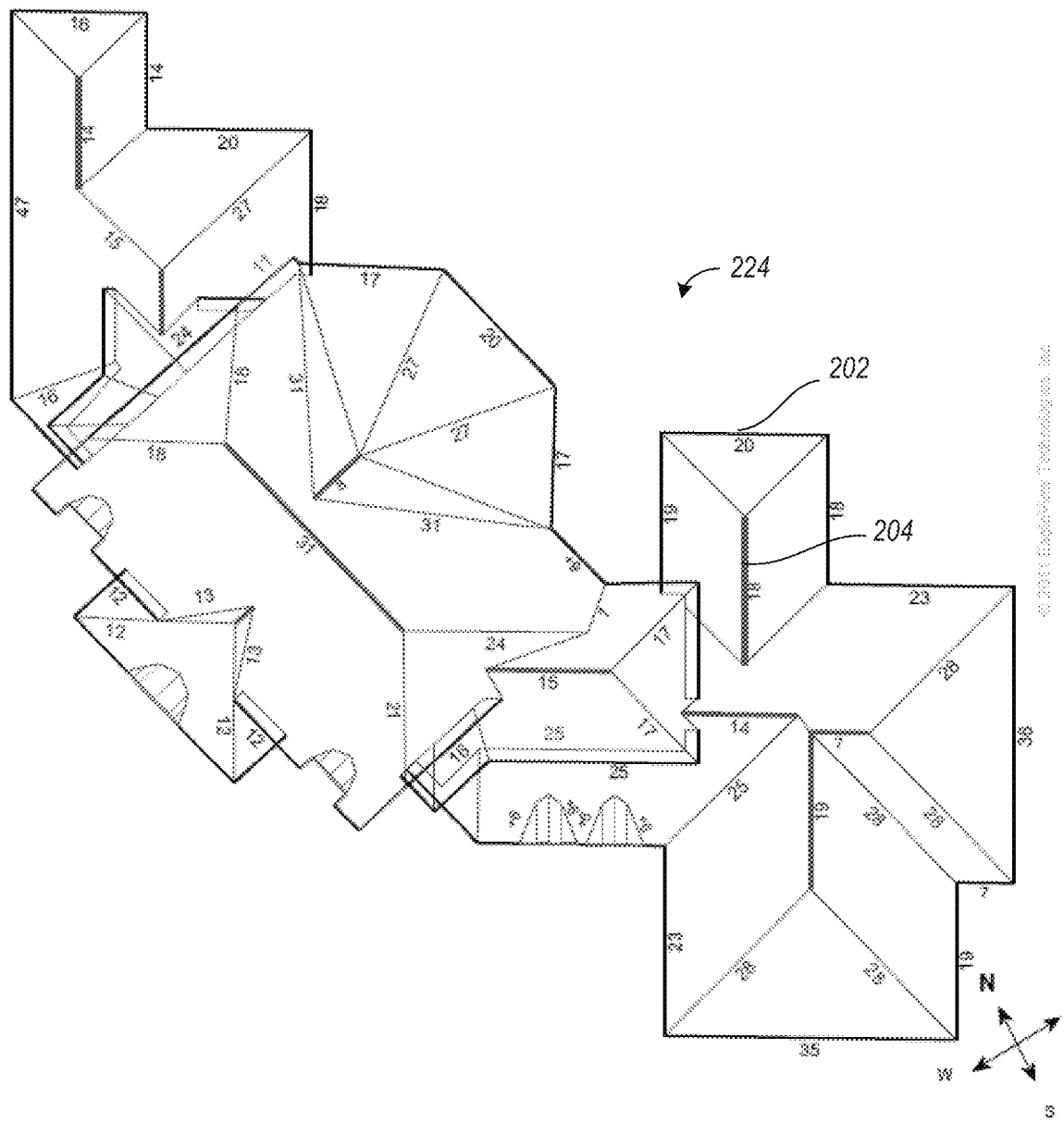
FIG. 4 is a map of the complex roof shown in FIGS. 3A and 3B, showing roof dimensions obtained by a computer-based building structure estimation system.

An example of such a roof report 224, for the exemplary large complex hipped roof, is shown in FIG. 4, in which measurements of roof feature lengths are expressed in feet. For example, the length of the ridge 204 as indicated is 18 feet, and the length of the eave 202 as indicated is 20 feet. Such roof reports 224 containing roof feature measurements are currently available to consumers by special order. The roof feature measurements are inputs to the materials overage estimation method described herein. Alternative methods of obtaining roof feature measurements as inputs to the materials overage estimation method described herein include measuring some or all of the roof features by other means e.g., by hand using a tape measure or other type of ruled tool, a laser measurement device, or another remote measurement tool. Additionally or alternatively, some or all roof feature lengths can be estimated by guessing.

Figure 5:
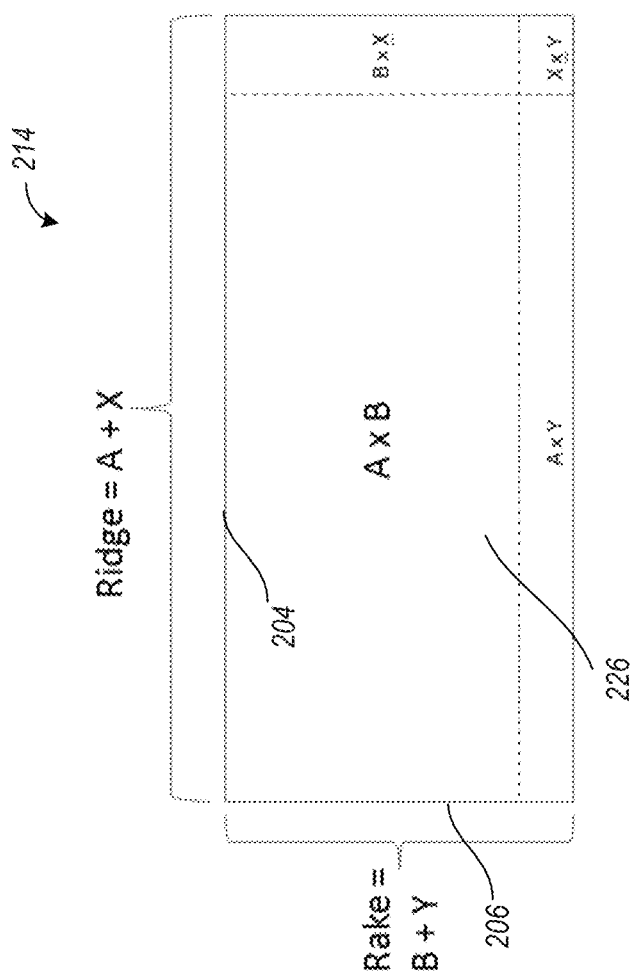
FIG. 5 is a schematic diagram of a side of an exemplary roof, segmented to facilitate an overage calculation as described herein.

Once a set of roof feature measurements is available, use of the computer-based materials overage estimation method as disclosed herein can commence. A materials overage estimation method, having accuracy as an objective can be understood by considering the following examples, with reference to FIGS. 5-6. FIG. 5 shows an exemplary plane section 226 of a roof, e.g., a side of a gable 214. The roof can be covered with any roofing material (e.g., shingles, tiles, shakes, or the like), however, the present examples will assume the material is standard composite 3-tab shingles, which are the most common material currently used in the United States. The plane section 226 is bordered by a ridge 204 having a total length Ridge=A+x and a rake 206 having a total length Rake=B+y. The area of the plane section 226 is therefore (A+x)×(B+y)=AB+Ay+Bx+xy. The portion of the ridge 204 of the plane section 226 represented by A is that which accommodates an integer number of roofing material units (i.e., 36-inch long shingles) and the portion represented by x is covered by a partial shingle. Likewise, the portion of the rake 206 of the plane section 226 represented by B is that which accommodates an integer number of 12-inch wide shingles, and the portion represented by y is covered by a partial shingle. It is noted that standard building codes require a 7-inch vertical overlap so that only 5 inches of the 12-inch shingle width is exposed. Therefore the effective width of each shingle along the length of the rake 206 is only 5 inches. Thus, for example, y=3 inches=0.6 shingles, and x=18 inches=0.5 shingles. In general A, in units of shingles, is the quotient of Ridge/36 inches and B, in units of shingles, is the quotient of Rake/5 inches. Then X, in units of shingles is the remainder of Ridge/36 inches and Y, in units of shingles, is the remainder of Rake/5 inches. It is noted that the effective conversion factor from square shingles to square feet is $$(36 \times 5) \text{ in}^2/\text{shingle} \times 1 \text{ ft}^2/144 \text{ in}^2 = 1.25 \text{ ft}^2/\text{shingle}. \quad (1)$$

With the above definitions, a number of wasted shingles for roofing the plane section 226 can be calculated as follows, with reference to FIG. 6. First, it is noted that shingles are typically laid in horizontal rows, starting from an eave, and working upward toward the ridge, so that each row of shingles is overlapped by the next row above it. The number of columns of shingles needed along the ridge 204 is (A+1) and the number of rows of shingles needed along the rake 206 is (B+1). If no material were re-used, the area of rake waste 228 would be $$RaW = (1-x)(B+1) * 1.25 \text{ ft}^2, \quad (2)$$

wherein (1−x) is the fraction of the last shingle of each row that is left over and wasted, and the area of ridge waste 230 is $$RgW = (1-y)[(A+1)-(1-x)] * 1.25 \text{ ft}^2 \quad (3)$$
$$= (1-y)(A+x) * 1.25 \text{ ft}^2.$$

Because the ridge waste 230 is made up of narrow strips along each shingle, it is typically considered that there is no opportunity for re-use. Therefore, RgW is fixed. If x and y are each 0.5, the ridge waste 230 is approximately equal to A/2.

Accordingly, by making use of equations (2) and (3), a maximum value that might end up as waste can be calculated and be more accurate than a simple estimate, since it takes into account the rake length, the ridge length and particular planar sections. It also recognizes that each flat section of a roof must be treated individually, as a single section, since a new row of shingles must be started at the bottom of each eave and a new column of shingles must be started along the edge of each rake. Thus, these equations take into account a more accurate understanding of the actual roof geometry, which includes multiple sections, each section treated as an individual roof segment.

Of course, to the extent possible, material on one section of the roof which has a sufficient remainder in a partial shingle can be reused in another section of the roof once the roofing is started. Normally, new shingles are used for the first row of shingles along the bottom of an eave. Depending on the type of roofing material, half shingles may be laid down as first base layer on top of a row of full shingles. As is known in the roofing industry, the first row of three-tab shingles laid along the eave may require that half of each shingle be attached to the roof and the other half of the shingle discarded in order to ensure a leak-proof roof and proper coverage. Accordingly, material waste from one section of the roof may be used to start the eave section on another section of the same roof. In addition, while it is common to start a column of shingles as new shingles along a rake, it is possible to reuse some percentage of a shingle in the middle of roofing a section of a particular roof. Accordingly, if we assume that, to the extent possible, partial shingles will be reused, then the amount of waste from each section can be calculated more accurately and also with substantially more efficient use of materials, as will now be explained.

The formulas (2) and (3) together can be used to calculate a maximum value for material waste, assuming no re-use. The overage in square feet for the plane section 226 can be approximated by $$RgW + RaW = (A+B)/2 * 1.25. \quad (4)$$

In practice, it can be assumed that a partial shingle, or remnant (1−x) is not re-used if it is less than half a shingle (i.e., less than 18 inches long), or, equivalently, if x>0.5. If the remnant (1−x) is greater than half a shingle (x<0.5), the remnant is typically re-used. If the re-usable portion is designated as R, then the rake waste is reduced by the re-useable portion according to:

$$RaW = [(1-x)(B+1) - R] * 1.25. \quad (5)$$

A general formula for the rake waste RaW, wherein $$1/(N+1) < X < 1/N; N >= 2 \quad (6)$$

can be postulated as $$RaW = \{[1/(N-x)](B+1) + (1/N)[N-(B+1) \bmod N]\} * 1.25. \quad (7)$$

Equation (7) takes into account a rippling effect of re-use, i.e., a) re-using a remnant generates a different-sized remnant at the end of the next row, and this effect continues to propagate through the various rows; and b) remnants smaller than half a shingle are discarded, while those greater than half a shingle are re-used. The first term in equation (7) represents the portion of each shingle that is unusable to complete other rows, and the second term in equation (7) represents waste incurred by extra pieces without the chance for re-use when there are no more rows left to cover. With re-use, then, the formulas (3) and (7) together can be used to calculate the overall material waste.

Once RgW and RaW are known, the overall percent waste is given by $$W = (RaW + RgW)/\text{plane area} = (RaW + RgW)/[(A+x)(B+y)]. \quad (8)$$

Equation (8) is one method of carrying out the step of computing a materials overage amount that is based on actual practice.

As has been described, with the use of the assumptions in equation (7), and taking into account equation (3), the actual overage needed can be calculated with a high degree of accuracy, and much more accurately than a roofing contractor's estimate based on his experience. Thus, a roofer may, in his experience, estimate an overall roofing waste of 15%, however, using the equations, the roofing waste may actually be closer to 4% for the roof as a whole. Thus, the correct amount of building material for the roof can be more accurately purchased and yet ensure that there is sufficient amount provided to roof the entire building with a single delivery of roofing material.

There are different techniques by which the overage can be calculated besides that which has been explained with respect to equations (1)-(8). Namely, a different technique may be used, based on applying weighting factors to different types of features in a roof, as will now be explained a second embodiment.

In a second embodiment, a weighting factor can be applied on a feature-by-feature basis, using values in Table I:

TABLE I

Worst Case Loss Factors

| Eave | 0/ft |
|---|---|
| Rake | 0.5/ft |
| Ridge | 1.0/ft |
| Hip | 1.67/ft |
| Valley | 1.67/ft |
| Wall Transition | 0.5/ft |

The worst case loss factors shown in Table I were developed empirically by considering real-world roof laying practices for each of the different roof features. Each of the weighting factors shown in Table I can be considered as a roofing constant, k, which varies depending on the particular features of the roof. Each roof has a certain cumulative length of each feature. For example, a total length of eaves, a total length of rakes, or a total length of ridges. In addition, each roof will have a certain cumulative length for each of a hip, a valley, and a wall transition. These different types of roof features each have their own k factor by which the length should be multiplied to take into account an amount of waste that is usually associated with a worst case loss of roofing material based on the cumulative length, in lineal feet, of each feature type that is present in a particular roof. The k factor includes within it a dimension of $ft^{-1}$. For example, the hip k factor is 1.67/ft.

In performing these calculations, a starting area is the foot print size of the building as a whole, not that of an individual roof section. For example, suppose the building is small and has a footprint of 20 ft.×40 ft. As will be appreciated, most homes are larger than 20 ft.×40 ft. and larger homes are shown in the example of FIG. 7 and, therefore, this will provide a good starting point with the understanding that most homes will have footprints larger than those shown in the spreadsheet (FIGS. 7-8). The spreadsheet is, therefore, only provided as an example of the inventive calculation having been carried out for certain building footprints in the range from 20 ft.×40 ft. to 40 ft.×80 ft. As can be appreciated, a building which has a footprint of 20 ft.×40 ft. will have a roof which is substantially larger thereon, because the size of the roof must take into account an overhang at each eave or rake as well as the pitch of the roof. The k factors shown in Table 1, accordingly, take into account the worst case loss factors, with further accommodation for the roof pitch, as shown in FIGS. 7 and 8.

Figure 6:
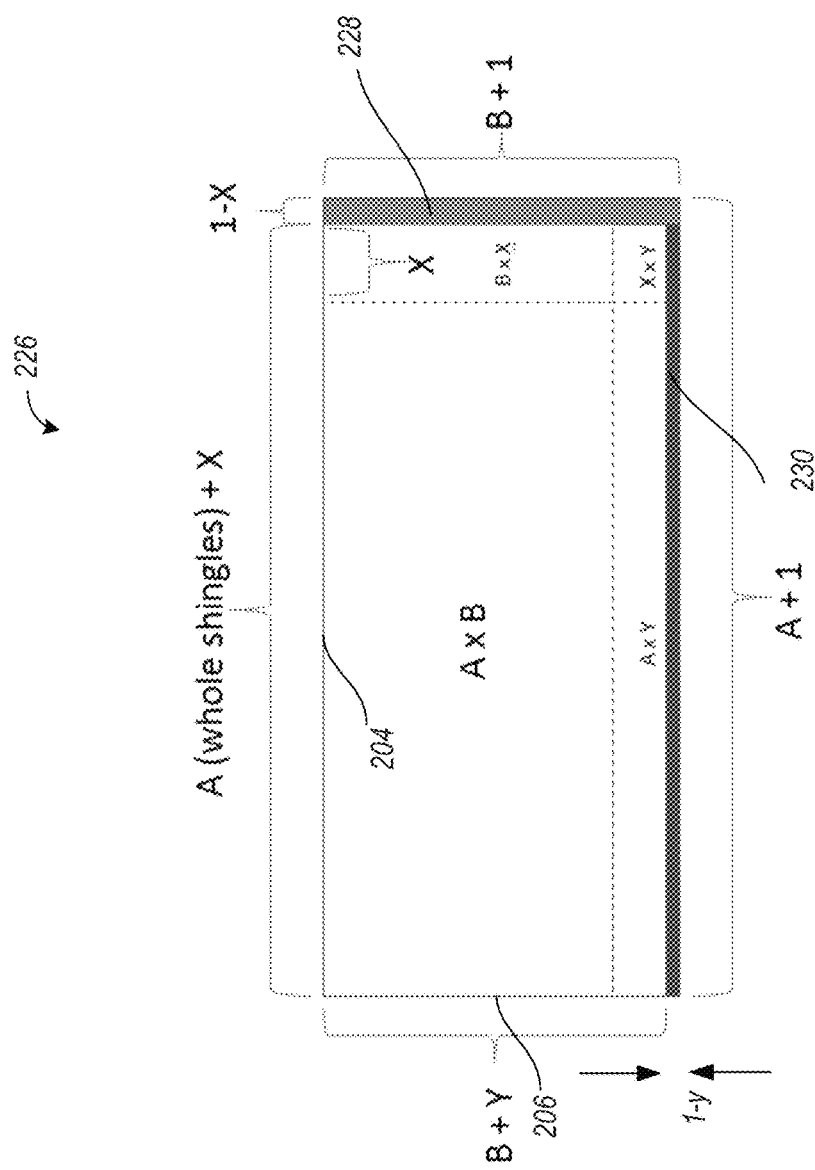
FIG. 6 is a schematic diagram of the side of the exemplary roof shown in FIG. 5, including waste material that would be cut during installation.
Figure 10:
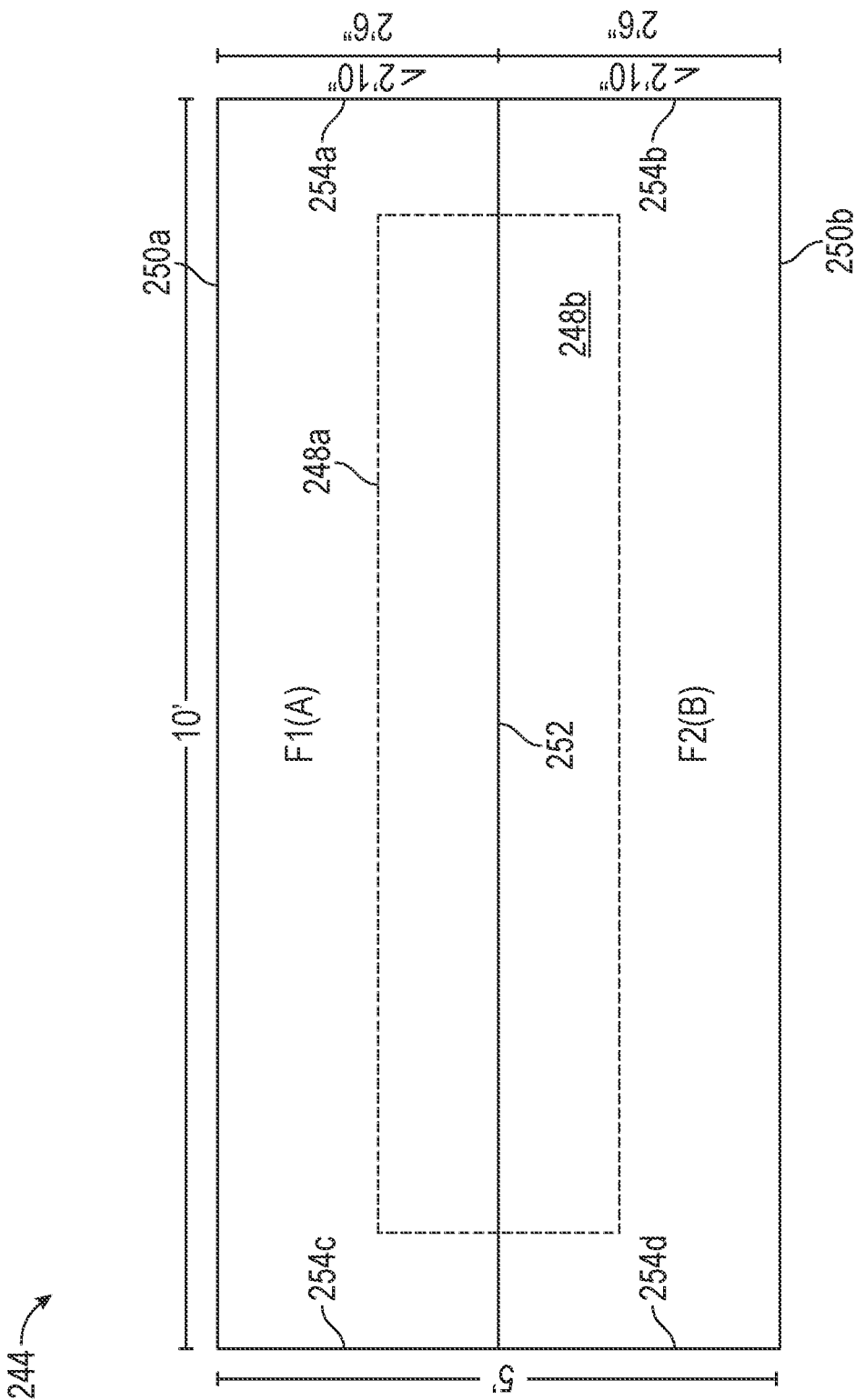
FIG. 10 is a top plan (orthogonal) view of a standard gable roof used as an example to illustrate the roofing material overage estimate described herein.

Consider the simple gabled roof example shown in FIGS. 5-6 and FIG. 10, in which the building footprint is 40'×80' and the roof has no hips, valleys, or wall transitions. Using the exemplary measurements from FIG. 10, a waste percentage value can be calculated by applying the worst case loss factors as follows (see also, line 4 of the spreadsheet shown in FIG. 7):

$$W=\{0*Eaves+0.5*Rakes+1.0*Ridges+1.67*Hips+\\1.67*Valleys+0.5*Wall\ Transitions\}*1.25\\ft^2=155.90\ sq\ ft,\ or\ 4.36\%. \quad (9)$$

If the building footprint is 20'×40,' Equation (9) becomes: $W=\{0*80+0.5*44.72+1.0*40+1.67*0+1.67*0+0.5*0\}*1.25\ ft^2=77.95\ ft^2$, or 8.72%. It is noted that in FIGS. 7-8, the rake length is modified to account for the pitch of the roof, giving a value of 44.72 instead of 40.

Figure 9:
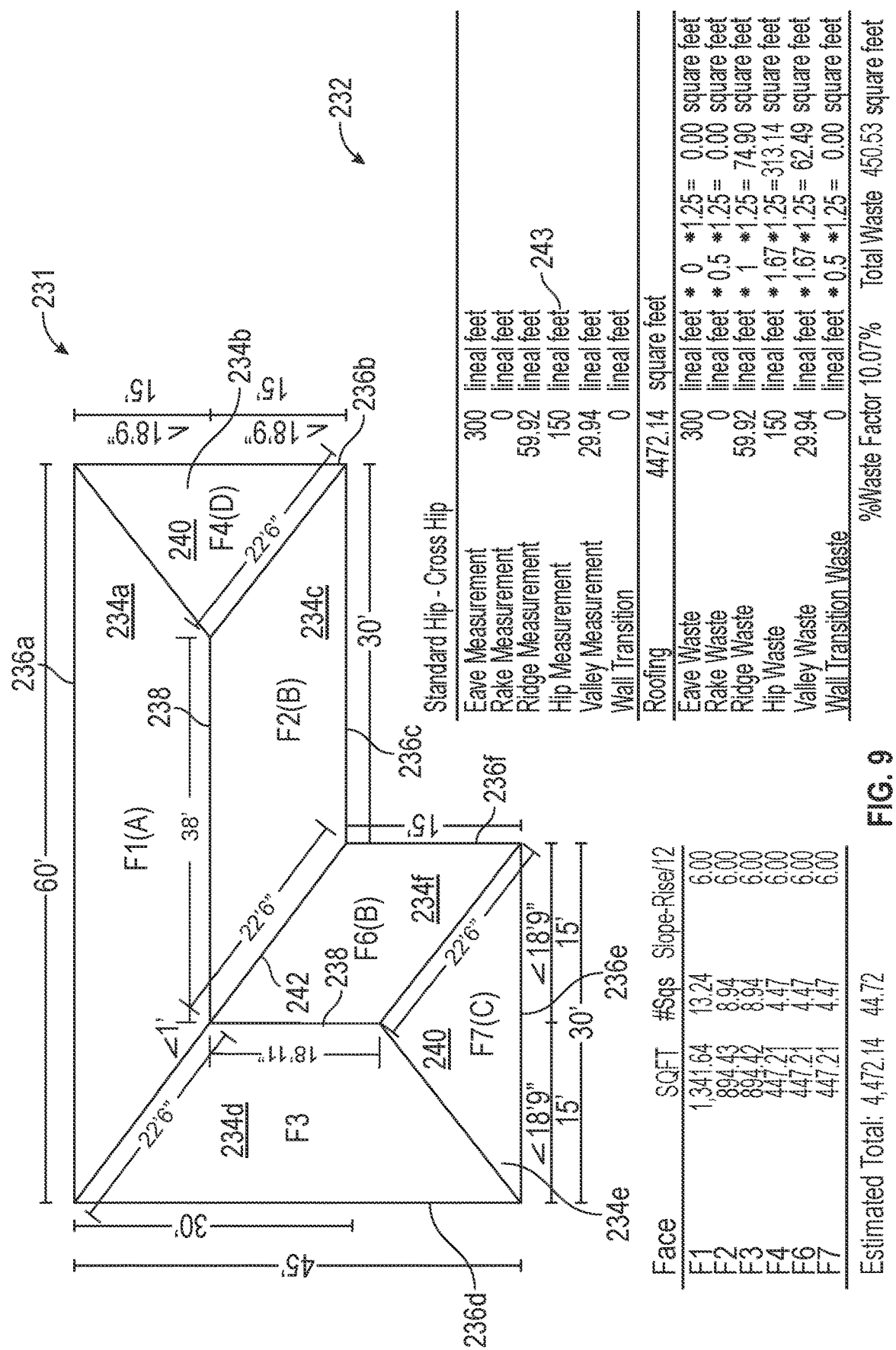
FIG. 9 is a top plan (orthogonal) view of a standard hip-cross hip roof used as an example to illustrate a roofing material overage estimate described herein.

It can be seen from the spreadsheet examples shown in FIGS. 7, 8, and 9 that the waste percentage varies greatly with the feature dimensions, and therefore the common practice of applying a standard factor based solely on one feature used to describe the overall roof shape, such as "gabled roof" or "hipped roof" is insufficient to produce an accurate estimate. The standard percentage ignores the fact that most roofs are combination roofs that are not characterized by just one shape. Whereas, when worst case loss factors for each feature type are weighted by actual feature dimensions as in Equation (9), a more accurate estimate can be obtained.

It is noted that the worst case loss factors listed in Table I can be refined over time to more closely match real data, thereby further improving the accuracy of the model. Such real data can change as the building industry acquires different labor practices, new tools, new building materials, and the like. The calculated method can be tested periodically by processing thousands of example roof reports containing measurement data, and comparing the estimated waste material with actual values recorded by contractors or insurance carriers. Therefore, the worst case loss factors are, thus, not limited to particular values and can be updated, and calibrated against real data, as needed. Moreover, additional loss factors can be added to the model as new roof features are designed.

Additionally, the computer-based materials overage estimation method can account for differences in building materials. For example, the amount of material exposed on a wood shake as compared with a three-tab shingle affects certain factors in the calculation, such as the square footage conversion factor, as well as the worst case loss factors. The spreadsheets presented as illustrations take into account the building materials used. For example, the spreadsheet shown in FIG. 7 applies to 3-tab shingles having 1.25 square feet of exposed surface area, while the spreadsheet shown in FIG. 8 applies to dimensional type shingles having 1.2 square feet of exposed surface area. As previously noted, that the spreadsheet calculations define 'size' as the building footprint, not the roof size; "squares" is a term used to describe the total roof area/100; and the rake and perimeter measurements are increased to account for the pitch (steepness) of the roof that has been determined previously. For example, a pitch of 6 is shown in the tables of FIGS. 7 and 8.

FIGS. 9-12 present results for examples of actual roofs that have been tested using the materials overage estimation system according to Equation (9). Actual roof feature dimensions for each roof have been extracted from a roof report that resulted from analysis of aerial image data by the roof modeling engine 122. The different roof features (ridges, hips, etc) are recognized by the roof modeling engine 122, and their dimensions can be accumulated as a sum in units of, for example, lineal feet.

FIG. 9 shows an exemplary "standard hip-cross-hip" type of hipped roof 231 and an accompanying spreadsheet excerpt 232 that implements Equation (9) for illustrative purposes. The hipped roof 231 has six faces 234a-234f (collectively, 234) with a total roof area of 4472.14 square feet. The hipped roof 231 includes six eaves 236a-236f (collectively 236), two ridges 238, two hip ends 240, and one valley 242. After extracting feature dimensions from a roof report, sums of each type of feature are accumulated, e.g., "hip measurement 150 lineal feet" 243. The sum total of 150 lineal feet of hip lines is then multiplied by the worst case waste factor for hips (1.67/ft.). The same procedure is carried out for the other architectural roof features, e.g., ridges, valleys, etc, wherein each feature corresponds to one or more cut lines at which the roofing material must be cut. Applying Equation (9) yields a total waste in square feet of 450.53 square feet, which, as a percentage of the total roof area is 450.53/4472*100=10.07%. The standard industry waste percentage used today applied in the prior art to hipped roofs is 14%. Thus, use of the inventive calculation would result in a smaller overage allowance paid to the contractor.

FIG. 10 shows an exemplary single gable roof 244. The single gable roof 244 has two faces 248a, 248b (collectively 248) with a total roof area of 3577.71 square feet. The single gable roof 244 includes two eaves 250a, 250b (collectively 250), one ridge 252, and four rakes 254a, 254b, 254c, 254d (collectively 254). Applying Equation (9) yields a total waste in square feet of 155.83 which, as a percentage of the total roof area is 4.36%. The standard industry waste percentage applied in the prior art to single gable roofs is 5%. Thus, use of the calculation would result in a slightly lower overage allowance.

Figure 11:
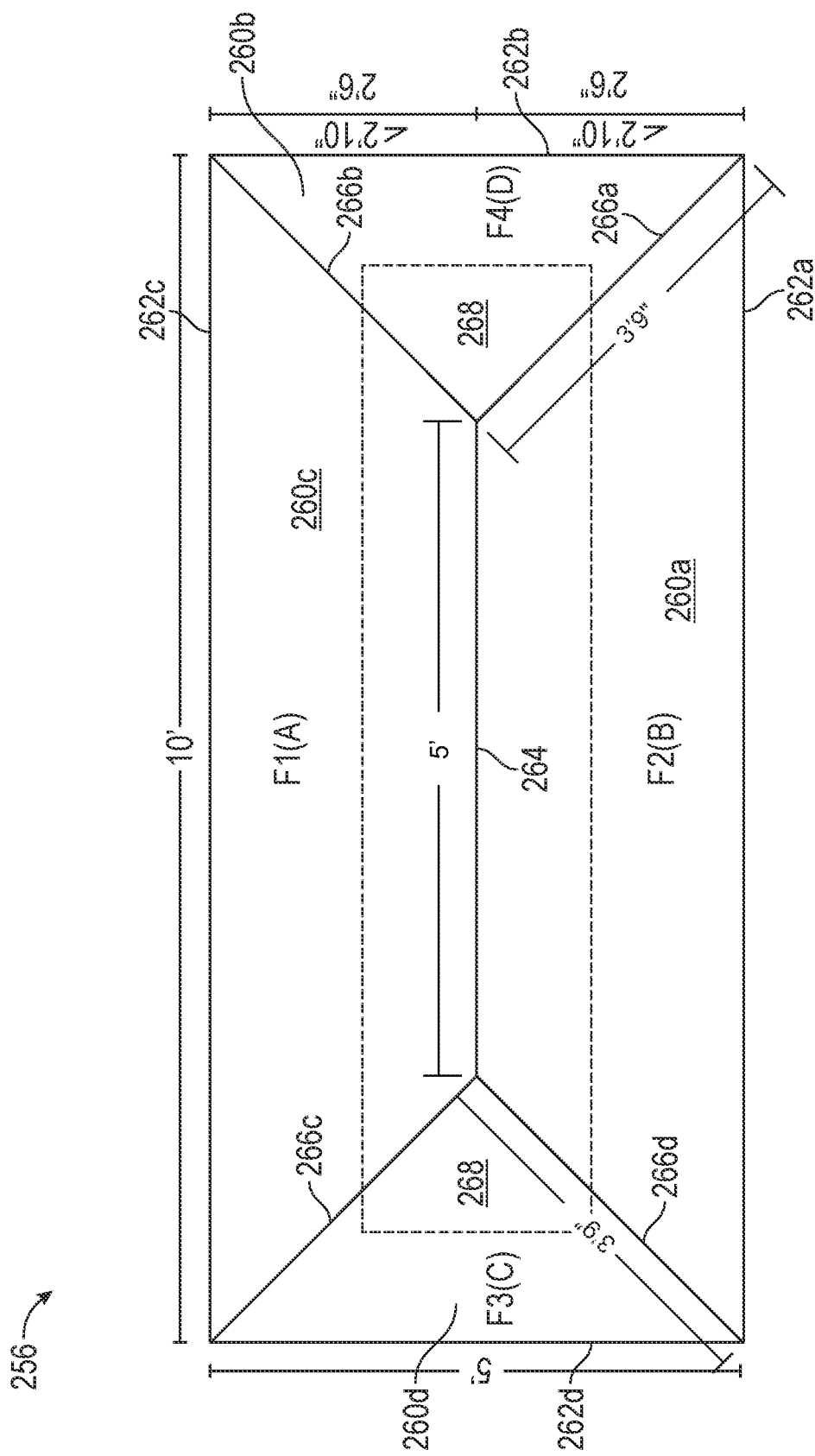
FIG. 11 is a top plan (orthogonal) view of a standard hip roof used as an example to illustrate the roofing material overage estimate described herein.

FIG. 11 shows an exemplary single hip roof 256. The single hip roof 256 has four faces 260a-260d with a total roof area of 3577.71 square feet (the same total roof area as the single gable roof shown in FIG. 10). The single hip roof 256 includes four eaves 262a-262d, one ridge 264, and four hips 266a-266d, and two hip ends 268. Applying Equation (9) yields a total waste in square feet of 300.5 which, as a percentage of the total roof area is 8.4%. The standard industry waste percentage applied in the prior art to single hip roofs is 14%. Thus, use of the calculation would result in a much lower overage allowance paid to the contractor.

Figure 12:
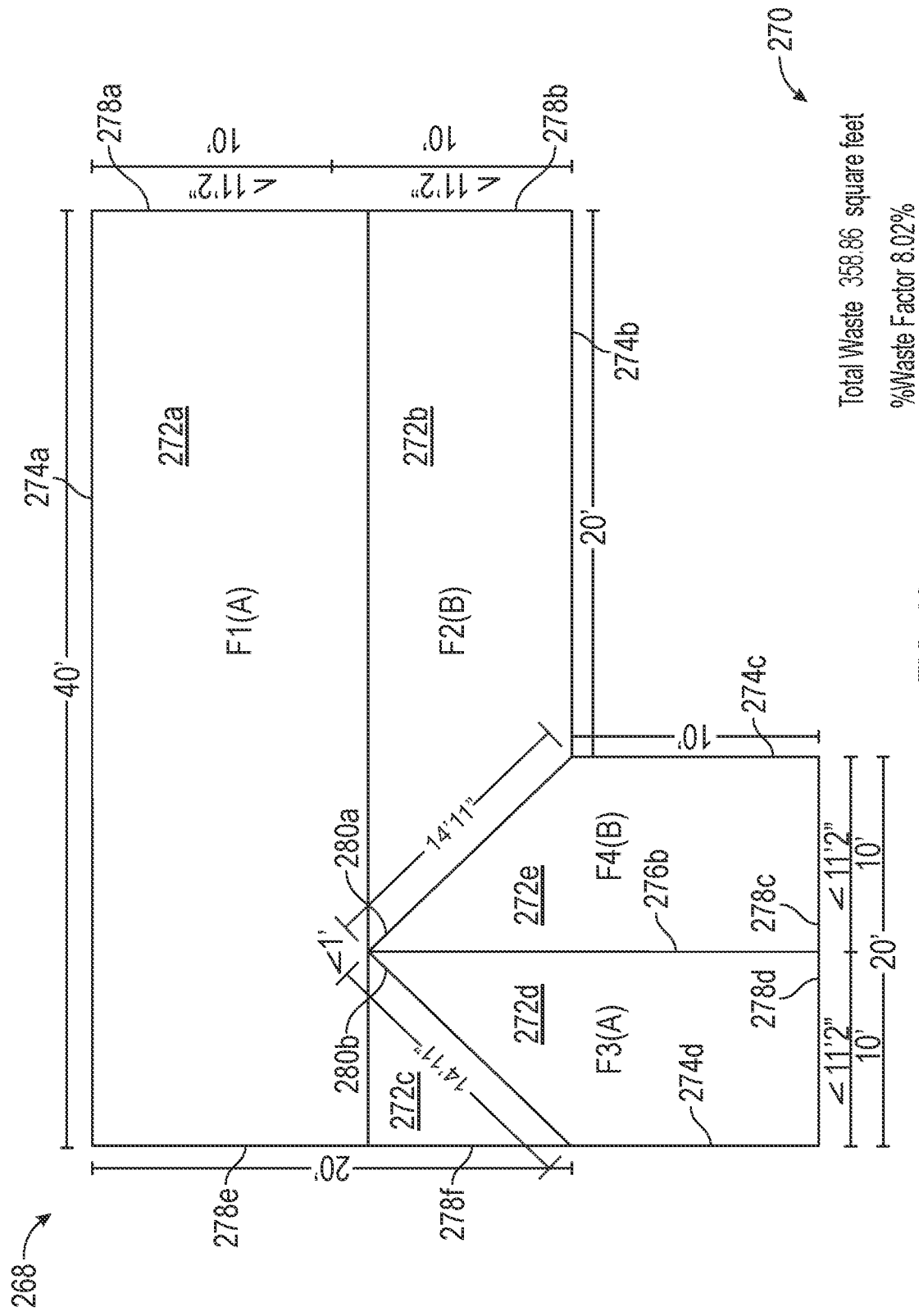
FIG. 12 is a top plan (orthogonal) view of a single gable—50% cross gable added roof used as an example to illustrate the roofing material overage estimate described herein.

FIG. 12 shows an exemplary combination roof 268 and an accompanying spreadsheet data 270 that implements Equation (9). The combination roof 268 has five faces 272a-272e with a total roof area of 4472.14 square feet (the same total roof area as the standard hip cross hip roof shown in FIG. 9). The combination roof 268 includes four eaves 274a-274d, two ridges 276a, 276b, six rakes 278a-278f, and two valleys 280a, 280b. Applying Equation (9) yields a total waste in square feet of 359.0, which, as a percentage of the total roof area is 8.0%. The standard industry waste percentage applied in the prior art to combination roofs is 14%. Thus, use of the calculation would result in a smaller overage allowance paid to the contractor.

Thirty-two real examples were used to test and validate the computer-based material overage estimation model described herein. Although none of the above exemplary roofs shown in FIGS. 9-12 are particularly complex, a similar calculation for the complex roof shown in FIG. 4, for example, becomes computationally much more demanding. The inventive material overage estimation method presented herein is therefore intended to be implemented, not necessarily as a spreadsheet application, but as part of the roof modeling engine 122 which feeds the report generation engine 126 to produce a roof report as a product for distribution to consumers. In one embodiment, this calculation will not normally take the form of a spreadsheet since this would be very large and complex for most roofs.

As previously mentioned, the party for whom the overage estimation is being performed may affect the benefits to be obtained by an accurate calculation. In one embodiment, the overage estimation is done at the request of an insurance company which is paying to replace a roof that has been damaged, such as by a hail storm or by a hurricane. The insurance company is interested in ensuring that sufficient material is provided so that the roof can be fully reconstructed in a single session and that no additional roof material needs to be delivered, since additional deliveries would cost more time and money to the insurance company. On the other hand, the insurance company does not want to overpay for roofing material and substantially overpay a contractor for roofing material which he does not purchase or use on this job and which he may save or take and use on another job. Accordingly, as can be seen herein, the roofing calculations are substantially more accurate as to the actual materials required and, thus, saves the customer or insurance carriers a significant amount of money over what they would actually pay to the contractors. In some of the examples given in FIGS. 9-12, the inventive calculations result in an actual overage amount in the range of 8%-10%, whereas in many instances, the industry standard would ask for overages in amounts of approximately 14%-15%. Accordingly, substantial money is saved by the customer or insurance company in purchasing the amount of roofing material need more accurately, with assurance that there will be sufficient material to finish the roofing job in a single project delivery.

In some instances, the percentage as determined by the inventive calculations are similar to those which would be determined by the industry standard in the prior art. For example, in some cases, the calculations yield a waste of approximately 4.5%, whereas the industry standard would assume a waste of approximately 5%. In other instances, the saving is substantially more and, for very large roofs and for large numbers of roofs, these savings can account a large amount of overall savings and efficiency in the delivery of material and avoid the purchase of unneeded roofing materials which were delivered to a site at which they will not be used.

In some instances, the person paying for the roofing job may be a homeowner, in which case the roofing contractor can discuss directly with the homeowner the desired calculation to be used in the ordering of the overage of material. The homeowner may wish to have either a slightly less or slightly greater overage calculation be performed, and they may be willing to assume the risk that a second delivery of materials may be needed.

Another significant benefit of the present inventive calculation is that materials can be more efficiently delivered to a large number of different work sites without running out of materials. For example, when a large natural disaster strikes a particular area, such as Hurricane Katrina destroying many homes or Hurricane Sandy destroying the roofs of many homes, roofing material can become very scarce in a particular geographical area, such as New Orleans or New York. In one instance, as the result of a large hail storm in Oklahoma, within a few days all roofing materials within a 100 mile radius were used and none were available. In order to obtain more roofing materials, it was required to pay more than double the cost of the normal roofing supply materials and also wait some time to have them shipped from a distant location. With the inventive calculation the amount of roofing material that actually needs to be delivered to a construction site can be more accurately determined so that excess roofing material is not delivered to a site at which it is not needed and instead can be delivered most efficiently at those sites at which it is needed.

Figure 13:
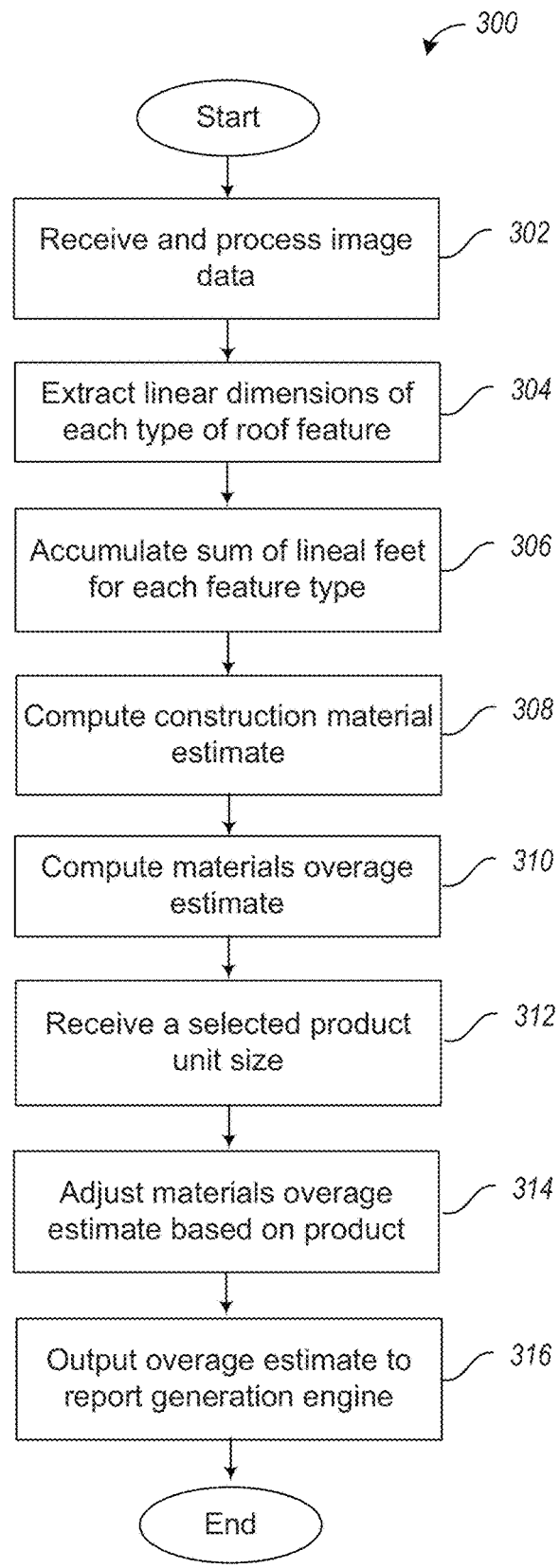
FIG. 13 is a flow diagram showing steps in a computer-based method of roofing material overage estimation that can be performed by the computing system 100 shown in FIG. 1.

FIG. 13 summarizes steps in a comprehensive method 300 of computing building materials overage in accordance with the embodiments described above.

At 302, image data of a building (e.g., a rooftop or other structural element of a building) can be acquired by the image acquisition engine 120 from an independent source. The image data can then be processed by the roof modeling engine 122 to create a model of the building or of associated structural elements. Such image data can include, for example, image data acquired by sensors, airborne systems, orbital or sub-orbital systems, handheld systems, vehicular systems, other ground-based systems, or images accumulated and stored in the data repository 130.

At 304, linear dimensions of architectural features can be extracted from the processed image data e.g., by the roof modeling engine 122.

At 306, sums of lineal dimensions of different types of features can be accumulated in the roof modeling engine 122.

At 308, construction materials needed for building or repair can be computed by the roof materials computation engine 125

At 310, an overage estimate of additional construction materials needed can be computed by the roof materials computation engine 125 to ensure a sufficient quantity of materials.

At 312 and 314, if a different building material is selected, the overage estimate can be received and adjusted to accommodate a different product unit size which may result in a different exposed area of product.

At 316, the overage estimate can be transferred to the report generation engine 126 for inclusion in an overall building estimate, or a report delivered to a customer such as a consumer, insurer, or contractor.

Alternatively or in addition, the computer-based material overage estimation method can be used as a planning tool in designing custom homes. For example, as a computerized set of architectural plans is updated with different architectural features or materials, the computer-based material overage estimation model can compute the amount of wasted material and feed that amount into a total cost estimate for building materials.

From the foregoing it will be appreciated that, although specific embodiments have been described herein for purposes of illustration, various modifications may be made without deviating from the spirit and scope of the present disclosure. For example, the methods, systems, and techniques for estimating roofing materials overage discussed herein may not be limited to the illustrated architectural structures, but may also be applicable to structural elements other than roofs, such as, for example, exterior walls, interior walls, ceilings, flooring, and the like. Furthermore, the methods and systems disclosed can be applied to materials estimation for 2D and 3D structures other than buildings, in other contexts or for other purposes. Such alternative applications may include vehicles, elements of transportation infrastructure such as roads, bridges, tunnels, landscaping and structures used in landscaping, and the like. Also, the methods and systems discussed herein may employ different types of network protocols, communication media (optical, wireless, cable, etc.) and devices (such as wireless handsets, electronic organizers, personal digital assistants, portable email machines, game machines, pagers, navigation devices such as GPS receivers, etc.). Further, the methods and systems discussed herein may be utilized not only by roofers and builders, but also by solar panel installers, roof gutter installers, awning companies, HVAC contractors, general contractors, and/or insurance companies, and the like.

The invention claimed is:

1. A process, comprising:
   determining an order amount of construction materials needed for construction or repair of a structural element of a building located at a building site, the order amount including an overage amount of the construction materials that accounts for construction material waste, by:
      receiving, with a microprocessor, a data set that includes image data associated with aerial photographs acquired by one or more remote sensors and processed by an image acquisition engine, without relying on a human estimator to be present at the building site;
      generating, with the microprocessor, from the image data, a three-dimensional model of the structural element of the building by matching point patterns of an oblique view of the building with point patterns of an orthogonal view of the building, using a point pattern matching computation engine; and
      generating, with the microprocessor, from the three-dimensional model, the overage amount of the construction materials, the overage amount not based on a fixed overall overage percentage, and the overage amount at least partly based on:
         deriving, by a materials computation engine, building dimensions of the structural element and numbers and dimensions of architectural types of features of the structural element;
         cumulating cut lines lengths for each of the specific architectural types of features of the structural element;
         multiplying each of the cumulated cut line lengths by a loss factor specific to a corresponding one of the architectural types of features of the structural element;
         summing the multiplied cumulated cut line lengths to generate a total length; and
         multiplying the total length by a square footage conversion factor, the square footage conversion factor based on exposed surface area of the construction material, to produce the overage amount.

2. The process of claim 1, wherein the order amount is further determined by:
   receiving, with the microprocessor, a selected construction material product unit size;
   adjusting, with the microprocessor, the overage amount based on product unit size compared to one or more surface areas of the structural element; and
   providing, with the microprocessor, the adjusted overage amount.

3. The process of claim 1, wherein the structural element is a roof.

4. The process of claim 1, wherein the construction materials include one or more of a shingle, shake, tile, metal sheet, slate, stone, or combinations thereof.

5. The process of claim 1, wherein the structural element is a wall.

6. The process of claim 1, wherein the aerial photographs are acquired by one or more of an airborne system, an orbital system, a sub-orbital system, or a vehicular system.

7. The process of claim 1, wherein generating the overage amount further comprises:
   determining an overage amount percentage relative to a total surface area of the structural element.

8. A process, comprising:
   determining an order amount of construction materials needed for construction or repair of a roof located at a building site, the order amount including an overage amount of the construction materials that accounts for material waste, by:
      receiving, by a microprocessor, a data set that includes image files of two different views of the roof acquired by one or more remote sensors, without relying on a human estimator to be present at the building site;
      generating, by the microprocessor, from the image files, a three-dimensional rendering of the roof by matching point patterns of a first, oblique view of the roof with point patterns of a second, orthogonal view of the roof; and
      determining, by the microprocessor, from the three-dimensional rendering, the order amount of construction materials needed to construct at least a portion of the roof, the overage amount not based on a fixed overall overage percentage, by:
         deriving, from the three-dimensional rendering, roof dimensions and types and numbers of features of the roof;
         cumulating cut line lengths of each of the features;
         multiplying each of the cumulated cut line lengths by a loss factor specific to a corresponding one of the features;
         summing the multiplied cumulated cut line lengths to generate a total length; and
         multiplying the total length by a square footage conversion factor, the square footage conversion factor based on exposed surface area of the construction materials.

9. The process of claim 8, wherein the order amount is further determined by:
   adjusting, with the microprocessor, the overage amount based on a construction material product unit size compared to one or more surface areas of the roof; and
   providing, with the microprocessor, the adjusted overage amount.

10. The process of claim 8, wherein determining the order amount further comprises:
    determining an overage amount percentage relative to a total surface area of the roof.

11. A method, comprising:
    determining an order amount of construction materials needed for construction of a structural element of a building, the order amount including an overage amount of the construction materials that accounts for material waste, by:
  generating, by a microprocessor, a three-dimensional rendering of a structure by matching point patterns of an oblique view of the building with point patterns of an orthogonal view of the building, the three-dimensional rendering derived from images acquired by one or more remote sensors without relying on a human estimator;
  extracting, by the microprocessor, from the three-dimensional rendering, type, number, and linear dimensions of each of a plurality of feature types of geometric features; and
  determining, by the microprocessor, the order amount of construction materials, in which the overage amount is not based on a fixed overall overage percentage and is based at least partly on:
    cumulating the linear dimensions for each of the feature types of the structural element;
    multiplying each of the cumulated linear dimensions by a loss factor specific to a corresponding one of the feature types;
    summing the multiplied cumulated linear dimensions to generate a total linear dimension; and
    multiplying the total linear dimension by a square footage conversion factor, the square footage conversion factor based on exposed surface area of the construction material.

12. The method of claim 11, wherein the structural element is a roof of the building.

13. The method of claim 11, wherein the building is an element of a transportation infrastructure.

14. The method of claim 12, wherein the images of the building are acquired by one or more of an airborne system, an orbital system, a sub-orbital system, a handheld system, a vehicular system, or a ground based system.

15. The method of claim 11, further comprising:
  receiving, by the microprocessor, a selected product unit size;
  adjusting, by the microprocessor, the overage amount based on the selected product unit size; and
  providing, by the microprocessor, the adjusted overage amount.

16. The method of claim 11, wherein determining the order amount further comprises:
  determining an overage amount percentage relative to a total surface area of the structural element.

17. A building method, comprising:
determining an order amount of roofing materials needed for a roof of a building, including an overage amount of the roofing materials, by:
  receiving, by a computer processor, image data associated with at least one oblique aerial photograph of the roof and at least one orthogonal aerial photograph of the roof;
  generating, with the computer processor, a three-dimensional model of the roof from the image data, at least in part by using point pattern matching to estimate which individual points on the at least one oblique aerial photograph of the roof match corresponding points on the at least one orthogonal aerial photograph;
  extracting, with the computer processor, type, number, and linear dimensions of features of the roof from the three-dimensional model of the roof;
  determining, with the computer processor, a base amount of the roofing materials by calculating areas of planes of the roof from the linear dimensions;
  determining, with the computer processor, the overage amount of the roofing materials, the overage amount accounting for materials that will be cut and that will create discard materials, by:
    multiplying each of the linear dimensions of the features of the roof by a weighting factor indicative of real-world waste practices for the type of feature, wherein the weighting factor is based on two or more of shape of the roof, size of the roof, size of materials to be used relative to lengths of the roof, and type of materials to be used;
    summing the multiplied linear dimensions to generate a total linear dimension; and
    multiplying the total linear dimension by a square footage conversion factor, the square footage conversion factor based on exposed surface area of the roofing materials; and
  adding, with the computer processor, the base amount with the overage amount to produce the order amount of roofing materials.

* * * * *